US008032824B2

(12) United States Patent  (10) Patent No.: US 8,032,824 B2
Croft et al.  (45) Date of Patent: *Oct. 4, 2011

(54) SYSTEMS AND METHODS FOR COMPARING DOCUMENTS CONTAINING GRAPHIC ELEMENTS

(75) Inventors: Lawrence Croft, Burnaby (CA); Rob Morgan, Burnaby (CA)

(73) Assignee: Eastman Kodak Company, Rochester, NY (US)

(*) Notice: Subject to any disclaimer, the term of this patent is extended or adjusted under 35 U.S.C. 154(b) by 274 days.

This patent is subject to a terminal disclaimer.

(21) Appl. No.: 12/414,693

(22) Filed: Mar. 31, 2009

(65) Prior Publication Data

US 2009/0193331 A1  Jul. 30, 2009

Related U.S. Application Data

(63) Continuation of application No. 11/114,078, filed on Apr. 26, 2005, now Pat. No. 7,555,712.

(60) Provisional application No. 60/564,946, filed on Apr. 26, 2004.

(51) Int. Cl.
G06F 17/00 (2006.01)

(52) U.S. Cl. ........................................ 715/229; 715/247

(58) Field of Classification Search ................. 715/255, 715/229, 230, 247
See application file for complete search history.

(56) References Cited

U.S. PATENT DOCUMENTS

| 5,465,353 A | 11/1995 | Hull et al. |
| 5,559,939 A * | 9/1996 | Wada et al. ................... 715/267 |
| 5,606,651 A | 2/1997 | Brown et al. |
| 5,701,500 A | 12/1997 | Ikeo et al. |
| 5,890,177 A | 3/1999 | Moody et al. |
| 5,982,931 A | 11/1999 | Ishimaru |
| 6,324,555 B1 | 11/2001 | Sites |
| 6,560,620 B1 | 5/2003 | Ching |
| 6,826,727 B1 * | 11/2004 | Mohr et al. ................... 715/235 |
| 7,028,900 B2 | 4/2006 | Capozzi et al. |
| 2002/0133515 A1 | 9/2002 | Kagle et al. |
| 2003/0068099 A1 | 4/2003 | Chao et al. |
| 2003/0101164 A1 | 5/2003 | Pic et al. |
| 2003/0106017 A1 | 6/2003 | Kanchirayappa et al. |
| 2003/0145206 A1 | 7/2003 | Wolosewicz et al. |
| 2004/0075699 A1 | 4/2004 | Franchi |

OTHER PUBLICATIONS

W. Miller and E.W. Meyers, "A File Comparison Program", Software Practice and Experience, 15(11), Nov. 1985, pp. 1025-1040.
"The String to String Correction Problem with Block Moves", ACM Transactions on Computer Systems, 2(4), Nov. 1984, pp. 309-321.
"A Technique for Isolating Differences Between Files", Communications of the ACM, 21(4), Apr. 1978, pp. 264-268.

* cited by examiner

Primary Examiner — Laurie Ries
(74) Attorney, Agent, or Firm — Nelson Adrian Blish

(57) ABSTRACT

A system and methods for comparing two documents comprising graphic elements is described. Attributes of graphic elements amongst the two documents are examined to identify sufficiently similar graphic elements. A merged document can be automatically produced based on the comparison. The merged document advantageously preserves the investment made in modifying a first document during a production phase. A means for viewing the comparison results and overriding the automatically generated merge actions is provided.

18 Claims, 17 Drawing Sheets

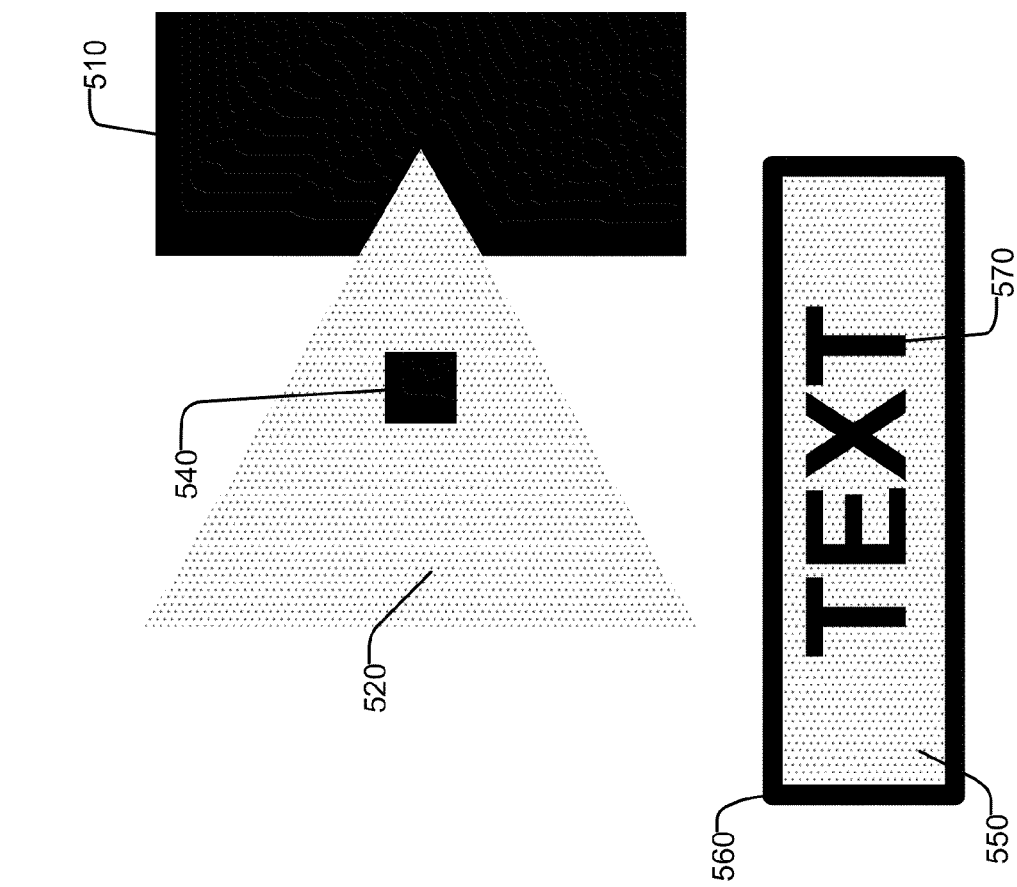
FIG. 5

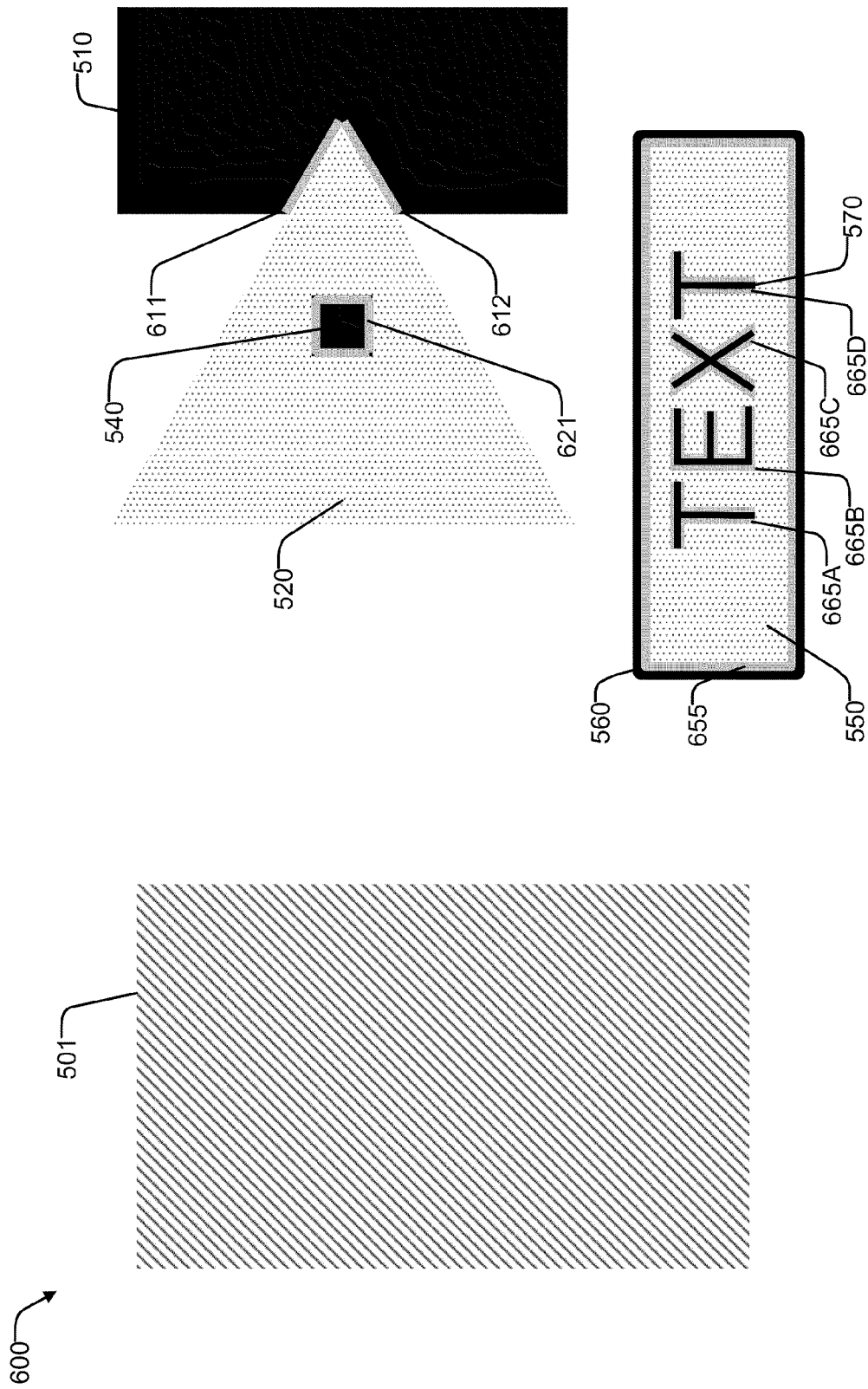

| Display Order (702) | Element Id (704) | Element Hash Value (706) | Selected Element Attributes (708) | | | Selected Production-Modified Attributes (710) | |
|---|---|---|---|---|---|---|---|
| 1 | 501 | 1 | Type = Image | | | | |
| 2 | 510 | 2 | Type = Path | Stroke = None, Fill = Dark | Clipping Path = CP1 | | Related Elements = 611,612 |
| 3 | 611 | | Type = Path | Stroke = None, Fill = Medium | | Trap | Related Elements = 510,520 |
| 4 | 612 | | Type = Path | Stroke = None, Fill = Medium | | Trap | Related Elements = 510,520 |
| 5 | 520 | 3 | Type = Path | Stroke = None, Fill = Light | | | Related Elements = 611,612,621 |
| 6 | 621 | | Type = Path | Stroke = None, Fill = Medium | Clipping Path = CP2 | Trap | Related Elements = 520,540 |
| 7 | 540 | 4 | Type = Path | Stroke=None, Fill=Dark | | | Related Elements = 621 |
| 8 | 550 | 5 | Type = Path | Stroke=None, Fill=Light | | | Related Elements = 655,665A-D |
| 9 | 655 | 6 | Type = Path | Stroke = None, Fill = Medium | | Trap | Related Elements = 550,560 |
| 10 | 560 | | Type = Path | Stroke = Dark, Fill = None | Stroke Width = Medium | | Related Elements = 655 |
| 11-14 | 665A-D | | Types = Path | Stroke = None, Fill = Medium | | Trap | Related Elements = 550,570 |
| 15 | 570 | 7 | Type = Text | Stroke = None, Fill = Dark | | | Related Elements = 665A-D |
| | | | | | | | Screen = S2 |

FIG. 7

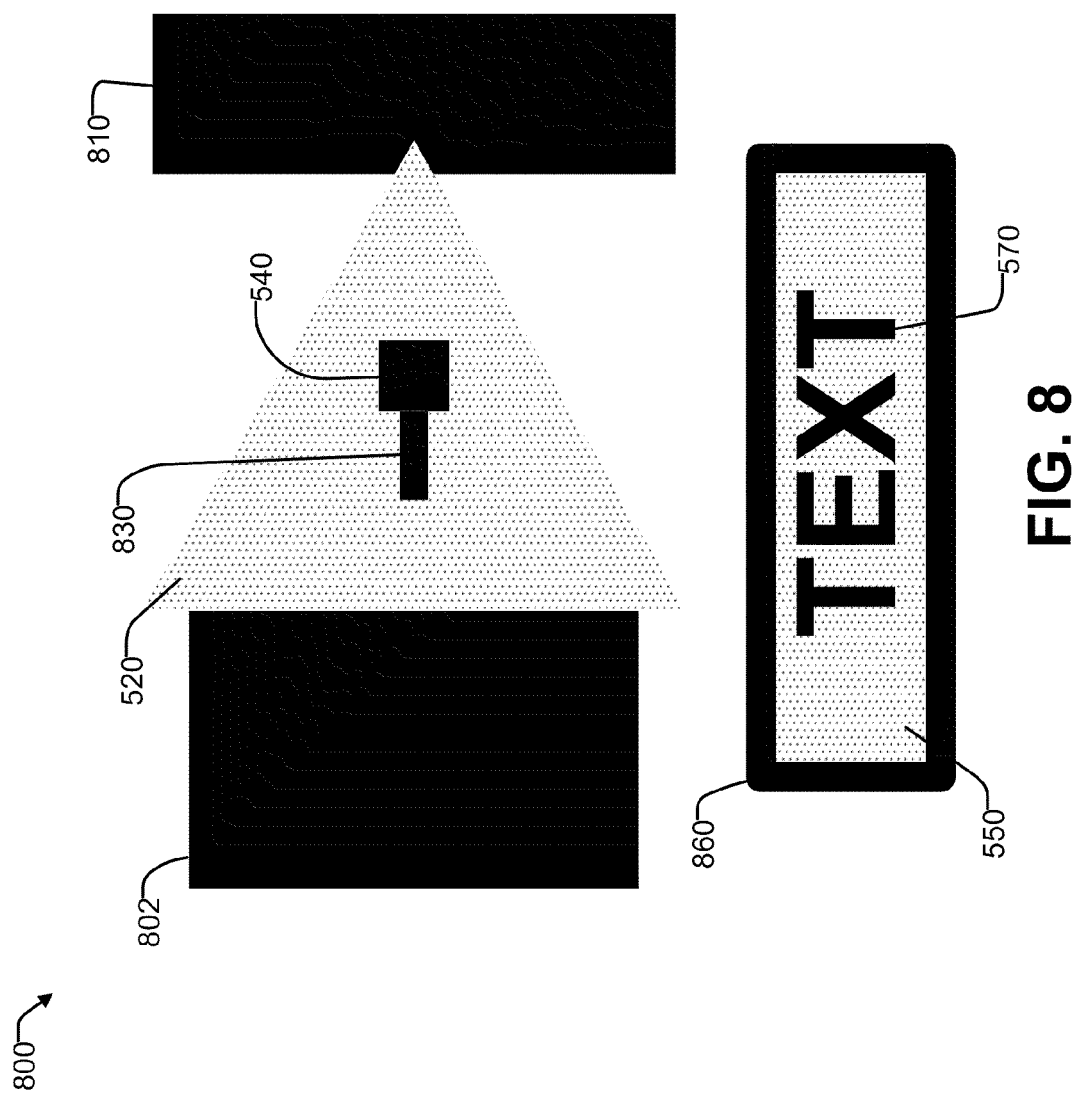

| Step | Edit Script Information | | Step Parameters | | | Element Information | | | | |
|---|---|---|---|---|---|---|---|---|---|---|
| | Step Action | Element Id | From Document | Add Location | Additional Processing Attributes | Type | Hash Value | Additional Processing Outcomes | Original Trapping Attributes | |
| 1A | Delete | 501 | 1 | | | Image | 1 | | | |
| 1B | Delete | 510 | 1 | | | Path | 2 | | | |
| 1C | Derived Delete | 611 | 1 | | | Trap Path | N/A | | Related Elements = 510,520 | |
| 1D | Derived Delete | 612 | 1 | | | Trap Path | N/A | | Related Elements = 510,520 | |
| 1E | Add | 802 | 2 | Before 810 | Trap | Path | 8 | 1303 generated | | |
| 1F | Add | 810 | 2 | Before 520 | Trap | Path | 2 | 1311 and 1312 generated | | |
| 1G | No Action | 520 | 1 | | | Path | 3 | | | |
| 2A | N/A | 621 | 1 | | Adjust Clipping Path | Trap Path | N/A | Adjusted to 1321 | Related Elements = 520,540 | |
| 2B | Add | 830 | 2 | Before 540 | Trap | Path | 9 | 1322 generated | | |
| 2C | No Action | 540 | 1 | | | Path | 4 | | | |
| 3A | No Action | 550 | 1 | | | Path | 5 | | | |
| 4A | Derived Delete | 655 | 1 | | | Trap Path | N/A | | Related Elements = 550,560 | |
| 4B | Delete | 560 | 1 | | | Path | 6 | | | |
| 4C-F | N/A | 665A-D | 1 | | Adjust Clipping Path | Trap Paths | N/A | No Change | Related Elements = 550,570 | |
| 4G | Add | 860 | 2 | Before 570 | Trap | Path | 6 | 1355 generated | | |
| 4H | No Action | 570 | 1 | | | Path | 7 | | | |

FIG. 10

| Display Order | Element Id | Selected Element Attributes | | Selected Production-Modified Attributes | |
|---|---|---|---|---|---|
| | | | 1208 | | 1210 |
| 1 | | Type = Path | Stroke = None, Fill = Dark | | |
| 2 | 810 | Type = Path | Stroke = None, Fill = Dark | | |
| 3 | 520 | Type = Path | Stroke = None, Fill = Light | | |
| 4 | 621 | Type = Path | Stroke = None, Fill = Medium | Clipping Path = CP2 | Related Elements = 520,540 |
| 5 | | Type = Path | Stroke=None, Fill=Dark | | |
| 6 | 540 | Type = Path | Stroke=None, Fill=Dark | | Related Elements = 621 |
| 7 | 550 | Type = Path | Stroke=None, Fill=Light | | |
| 8 | 860 | Type = Path | Stroke = Dark, Fill = None | | |
| 9-12 | 665A-D | Type = Path | Stroke = None, Fill = Medium | Trap | Related Elements = 550,570 |
| 13 | 570 | Type = Text | Stroke = None, Fill = Dark | | Related Elements = 665A-D |

FIG. 12

SYSTEMS AND METHODS FOR COMPARING DOCUMENTS CONTAINING GRAPHIC ELEMENTS

CROSS REFERENCE TO RELATED APPLICATIONS

This application is a continuation of U.S. application Ser. No. 11/114,078, filed Apr. 26, 2005, now U.S. Pat. No. 7,555,712, which claims the benefit of U.S. Provisional Patent Application No. 60/564,946, filed Apr. 26, 2004, each of which is incorporated herein by reference in its entirety.

FIELD OF THE INVENTION

This invention relates to comparing documents comprised of graphic elements to identify similarities and/or differences between the documents being compared. Some embodiments of the invention facilitate merging graphic elements from documents.

BACKGROUND OF THE INVENTION

Document creation and production (e.g. printing) often involves making changes to a document. The changes may result from iteration in the content creation phase, corrections identified after the content creation phase or requirements of the production phase. Inevitably, different versions of a document result. Persons working with different versions of documents desire tools for identifying differences between versions. In some circumstances, there is a desire to merge some content from one version of a document with other content from another version of the document.

Prior art for accomplishing this is well known. Microsoft® Word® 2003 software includes features capable of identifying differences between documents consisting primarily of textual content. For example, two documents, having some common textual content, can be compared to identify components common and unique to each document. Furthermore, one document can be merged with the other, based on information obtained during the comparison.

In the graphic arts field however, documents often comprise content including combinations of text, photographic images and artwork.

Microsoft® Word® 2003 provides only limited support for comparing and merging non-text elements. For example, a Microsoft® Word® 2003 document containing a combination of text, inserted images and artwork (drawn with the integrated drawing function provided by Microsoft® Word® 2003) can be compared. The comparison does not recognize changes that involve substituting an inserted image file with a file having a different filename corresponding to a modified form of the original image. Similarly, the comparison does not recognize certain changes in the drawn artwork (e.g. changing the dimensions of a drawn rectangle). Other changes in artwork, such as changing the fill color of a drawn rectangle cause the entire drawing frame to be recognized as different during a comparison.

Other document creation software, such as Adobe® FrameMaker® 7.0 exhibits similar behavior. The user documentation for Adobe® FrameMaker® 7.0 indicates that artwork objects placed in an anchored frame, within the text flow of an Adobe® FrameMaker® 7.0 document, are compared. If the objects are different, or if they are in different positions (for example, if they have a different front-to-back order), the entire anchored frame is marked as changed. Experimentation reveals that some changes to objects, such as resizing, are not recognized during a comparison. Similarly, changes to artwork inserted as an encapsulated PostScript® (.eps) file, are not recognized during a comparison.

Document interchange formats can represent documents having mixed content. Some document interchange formats, such as TIFF and CT/LW, normalize content as raster pixels. An advantage of this format is that conversion to a production format is relatively simple, since most display and printing devices are raster-oriented. A disadvantage of this format is that information about the structure of the content is lost during the rendering process that produces raster pixels.

There exists software tools for comparing raster documents. Such tools may compare raster pixels to determine differences. Typically, these differences are displayed visually by highlighting individual pixels in a contrast color or by highlighting a region surrounding any changed pixels. Merging two raster documents can be accomplished by manually selecting pixels from each document. This is not practical where significant differences occur. Automation is also difficult since there is little context information upon which to determine the document to select for each pixel. An example of a tool that compares raster images is Artwork Systems ArtPro™ 6.5, which provides an "export differences" function that operates to compare two jobs. When calculating the differences, ArtPro™ scans the job in pixels, it does not look at vector information.

Other document interchange formats, such as Adobe® PostScript® and Adobe® Portable Document Format (PDF), represent content as vector elements. A document comprises page description language statements that define vector-based graphic elements (e.g. text, images and symbol clipping paths). The language describes elements with attributes identifying their characteristics and their layout on a page. The language also describes the order in which each element is to be displayed on a page. In this context, vector format has advantages and disadvantages opposite those of raster format.

Adobe® Acrobat® provides a document comparison function with three levels of analysis detail. Experiments, using PDF files created by printing from modified versions of an Adobe® Illustrator® document suggest that pixel comparison is being performed. For example, comparing with the most detailed level of analysis, Acrobat® can detect a single pixel variation in an imported image. This is highlighted visually as a path surrounding the vicinity of any changed pixels. Similarly, changes made to a PDF file using a PDF editor application (e.g. Enfocus Pitstop™) to increase the size of a path graphic element (e.g. a triangle shape) are detected by Acrobat® and visually highlighted as changes in a small portion of the boundary of the path graphic element. The entire path graphic element is not highlighted as having been changed.

Enfocus Pitstop™ allows a user that is editing graphic elements in a PDF document to identify differences based on session logs that track edits made to graphic elements within that document.

Creo® Seps2Comp™ software examines attributes of graphic elements from multiple pages of a single document. Each page of the document represents a different printing colorant, generated from a composite-color document during the step of creating the document interchange format. Seps2Comp™ examines attributes of graphic elements to infer the composite graphic element based on similarity between attributes of the color-separated graphic elements. Similar elements from separate pages can be composited by combining their colorants and tonalities from separate pages into a single graphic element on a single page. Seps2Comp™ only operates in an automated fashion. In some situations, it can inappropriately declare graphic elements as being similar or different. The algorithms and rules for determining similarity are not ideal and no method for compensating for mistakes exists.

Thus, there is an unfulfilled need for systems and methods for comparing documents containing a variety of types of elements. Printing of packaging materials is one field where the needs are acute. Two factors exacerbate the acuteness. First, packaging documents are often produced with variations to suit needs of different regions or markets. The variations are usually included in the original native document format and may be manifested as separate layers that can be selectively enabled prior to producing the document interchange format for a specific region or market. Thus, a number of different documents may be printed from each original document. The multiple documents can include a significant number of common graphic elements.

Second, during the print production phase, a packaging converter will invest significant time and skill in preparing a document for printing. This can include trap-processing, which adds graphic elements, at boundaries between graphic elements to improve the quality of the printed material. It can also include halftone screen assignment, which specifies the nature of the rendered pixels, on a graphic element basis, to improve the quality of the printed material. It can also include editing the graphic elements to make corrections in content, such as fixing spelling mistakes. Other print production processing activities can also occur.

Packaging converters, faced with two or more significantly common documents, cannot afford to absorb the significant costs associated with duplicating production activities to account for regional variations and last-minute content changes. Furthermore, the process for producing printing plates is time-consuming and packaging converters require tools for visualizing the differences between documents prior to making plates. Visualizing differences at the graphic element level, instead of the pixel level, is important. In many cases, regional variations or content changes affect only specific plates corresponding to specific colors (usually black and spot colors).

SUMMARY OF THE INVENTION

This invention provides systems and methods for comparing documents. Preferred embodiments compare vector format documents such as documents conformant with the Adobe® Portable Document Format (PDF) specification. A system according to one embodiment of the invention includes an Adobe® Acrobat® plug-in software module that comprises a document comparator and a document merger. The Document Comparator examines attributes of selected graphic elements in a first document and a second document to generate an edit script that identifies graphic elements that would need to be deleted from the first document and graphic elements that would need to be added to the first document to make the first document like the second document. The selected graphic elements may correspond to graphic elements created during the content creation phase.

Examined graphic elements may be compared using rules that allow graphic elements with only minor differences in attribute values to be identified as equivalent. The Document Merger applies the edit script to the first document to produce a merged document that is similar to the second document. Applying the edit script causes deletion of graphic elements unique to the first document and addition of graphic elements unique to the second document. Because of the selection criteria and rules applied by the Document Comparator, graphic elements from the first document that are sufficiently similar to those in the second document may be preserved. Graphic elements from the first document that were not selected for comparison can also be preserved. Preservation of graphic elements is particularly advantageous when those graphic elements were affected by significant investment of time and skill during a production phase.

An optional Comparison Visualizer applies portions of the edit script, in conjunction with the first and second documents, to produce a layered view with each layer showing certain graphic elements. One exemplary layered view presents graphic elements in three layers. One layer contains graphic elements common to both documents. Another layer contains graphic elements unique to the first document. A third layer contains graphic elements unique to the second document. Controls are provided to alter the visual appearance of identified graphic elements to facilitate visualization of similarities and differences amongst graphic elements. The Comparison Visualizer also provides controls to select one or more graphic elements and override the actions, corresponding to the selected graphic elements, in the edit script.

Thus, user-defined modifications of the automatically generated edit script can be made and the modified edit script re-applied to produce a desired merged document result. Optional Additional Document Processing components examine graphic elements in the merged document to perform additional processing. As an example, a trap-processing engine processes the merged document to adjust trap graphic elements preserved from the first document and add trap graphic elements. Both may be required by the addition of graphic elements from the second document.

These and other aspects of the invention and features of embodiments of the invention are illustrated in greater detail in the detailed description.

BRIEF DESCRIPTION OF THE DRAWINGS

In drawings which illustrate non-limiting embodiments of the invention:

FIG. 5 is a diagram illustrating the rendered appearance of a first document, after content creation;

FIG. 6 is a diagram illustrating the rendered appearance of a first document, after initial production processing;

FIG. 7 is a data structure diagram illustrating the document corresponding to FIG. 6;

FIG. 8 is a diagram illustrating the rendered appearance of a second document, created by revising content of a first document;

FIG. 10 is a data structure diagram illustrating an edit script capable of merging a second document into a first document;

FIG. 12 is a data structure diagram illustrating the document corresponding to FIG. 11;

DETAILED DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
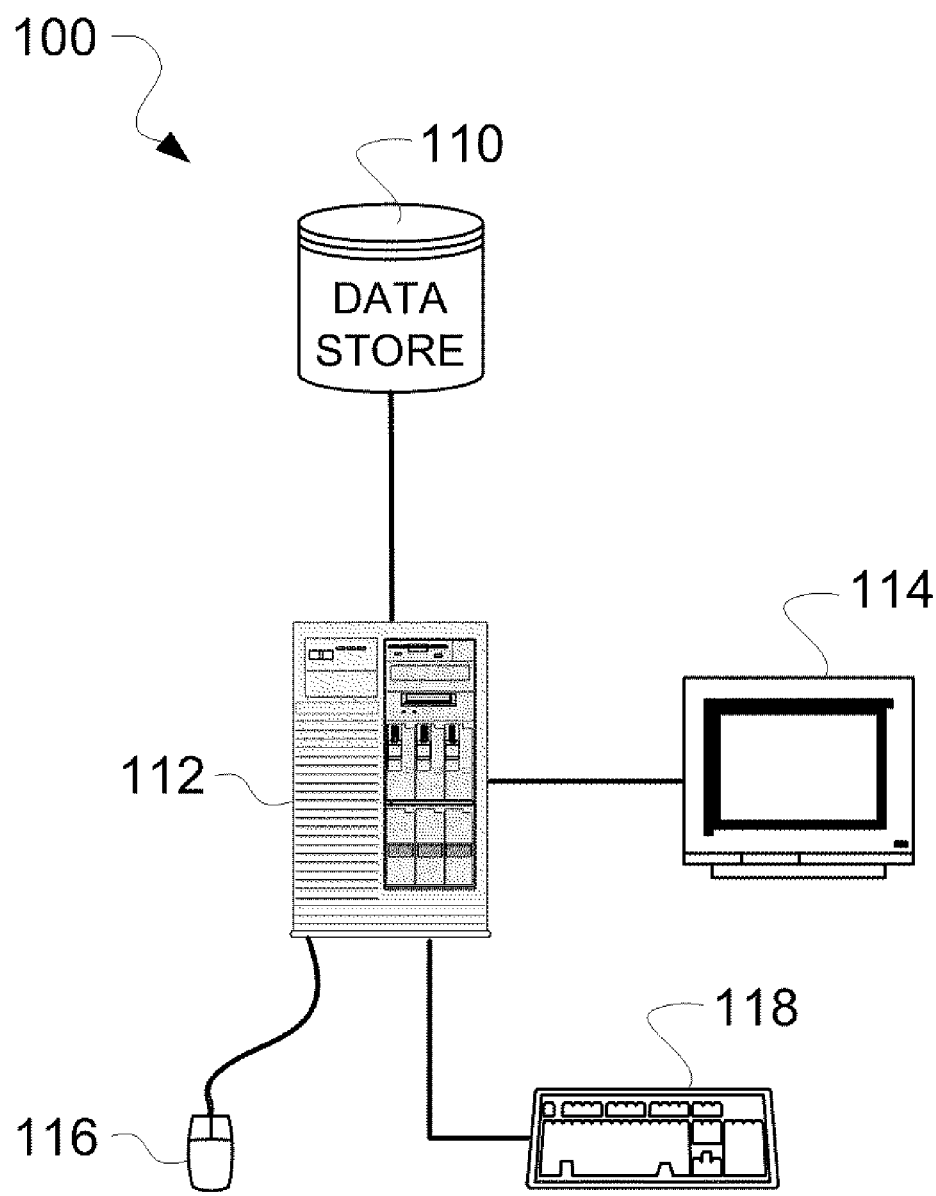
FIG. 1 is a schematic diagram representing a computer system environment according to one embodiment of the invention.

FIG. 1 is a schematic diagram of a computer system 100 according to an embodiment of the invention. Computer system 100 has a processing unit 112 that operates a software embodiment of the invention. Processing unit 112 has access to data store 110 providing temporary and permanent storage of data. Data store 110 can be part of computer system 100 or can be provided in another computer system accessible to processing unit 112. Processing unit 112 has a user interface comprising one or more input devices and output devices. For example, output devices can include a graphical monitor 114 suitable for presentation of a GUI, and input devices can include a mouse 116 and a keyboard 118.

The remainder of the description describes operation of embodiments of the invention by illustrating:

A method for automatically comparing a first document and a second document to produce a merged document while preserving production phase investment in graphic elements of the first document;

A method for automatically determining graphic element similarity and an edit script consistent with the merging method above;

An example illustrating the methods above; and

Methods for visually comparing the common and unique graphic elements among two documents that also allow a user to modify an edit script consistent with the merging method above.

Automatic Merging

Figure 2:
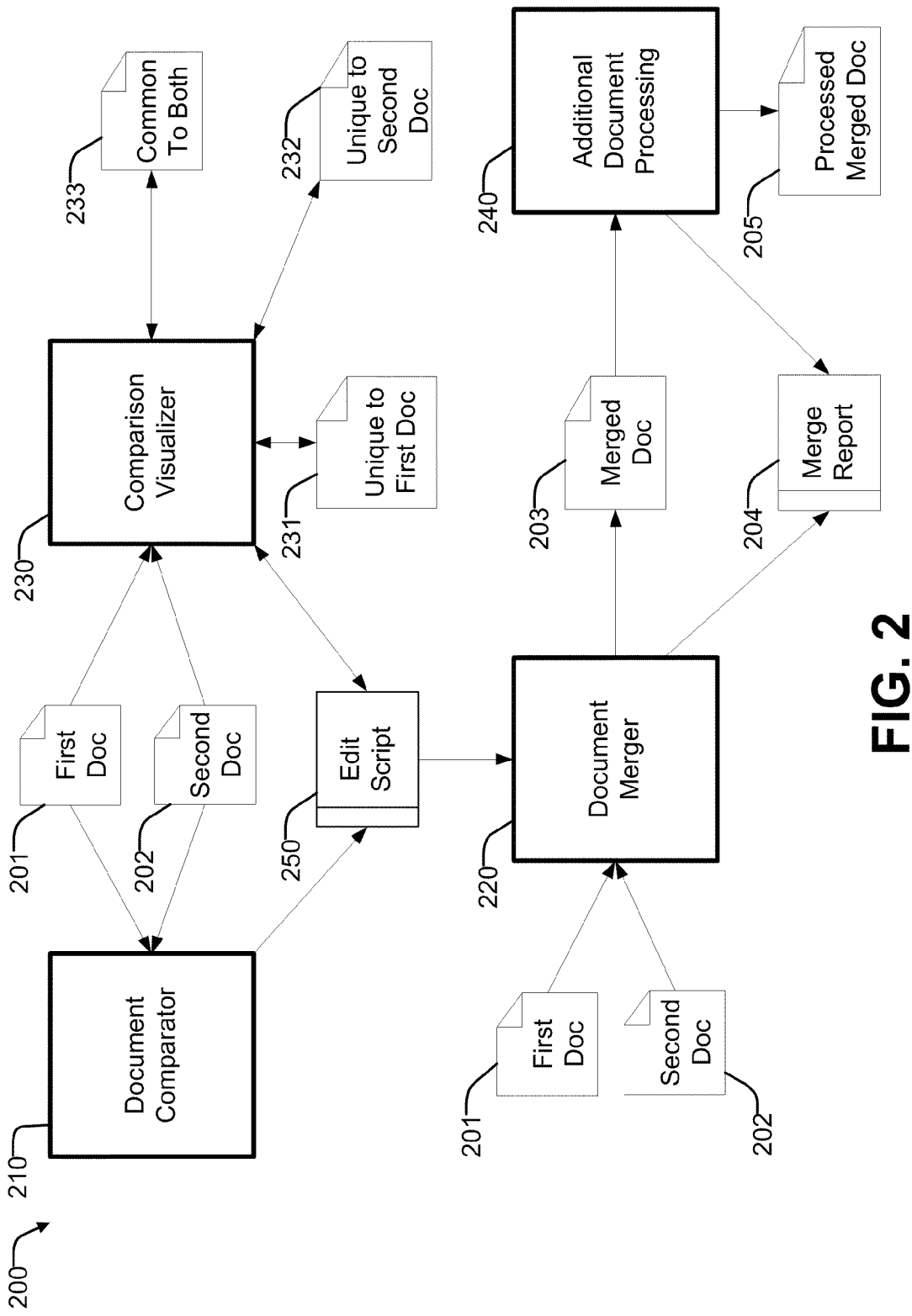
FIG. 2 is a block diagram illustrating the functional components of a system according to one embodiment of the invention.

FIG. 2 is a block diagram illustrating the functional components of computer system 100 according to an embodiment of the invention. A first document 201 comprises page description data, which defines the layout of one or more pages to be printed using a page description language. The page description data defines graphic elements such as text, images, and artwork (e.g. paths, shadings and blends). Graphic elements have attributes that relate to their visual appearance (e.g. clipping path, stroke, fill, and font type). A second document 202 is similarly constructed. For illustrative purposes, a contrived history of example first and second documents is outlined below.

In this example, documents 201 and 202 have a common origin, having been produced during a first content creation phase by an artist, whose goal was to produce a particular visual intent. Graphic elements defined during a content creation phase are considered "content graphic elements". First document 201 was modified during a first production phase, following the first content creation phase. The purpose of the modifications was to improve the quality of the printed result or to facilitate some production process. During the production phase, graphic element attributes in first document 201 were modified (e.g. halftone screens were assigned or modified). Trap graphic elements were also added to first document 201 during the production phase. These production phase activities involved some labor-intensive activities. Graphic elements, such as trap graphic elements, added during the production phase are considered "production graphic elements". Graphic element attributes modified during the production phase are considered production-modified graphic element attributes. First document 201 was ready to print from a production perspective. However, the content of first document 201 is no longer suitable to print.

Second document 202 was created during a second content creation phase that involved making revisions to first document 201 to reflect new or changed content. The revised content can include corrections or changes in artistic intent. Regardless, a second production phase begins, corresponding to processing of second document 202, which has the goal of printing second document 202 while preserving as much first production phase investment in first document 201 as possible. Investment in the production phase of first document 201 can be preserved where it is independent of content revised in second document 202.

According to one embodiment of the invention, documents are PDF documents produced, for example, by printing from a document creation application using Adobe® PDF Writer. In such an embodiment, some or all of the processing parts of system 200 can be encapsulated as software plug-ins compatible with Adobe® Acrobat® software. For illustrative purposes, the remainder of this description is based on PDF documents and Adobe® Acrobat® plug-in architecture. Other embodiments can include other software architecture models and document formats. Alternative document formats are compatible with the invention if the document format can be interpreted to form a display-ordered list of graphic elements.

"Display-ordered" means that, when rendered by an image processor, the document's graphic elements are displayed in a specified order. Display ordering is important when graphic elements overlap with one another. Image processors can choose to display later-ordered graphic elements using a knockout or overprint technique. A knockout technique results in a later-ordered graphic element obscuring earlier ordered graphic elements in regions where they overlap. An overprint technique results in colorants from overlapping graphic elements combining in regions where they overlap. The resultant combination can depend, at least in part, on the relative ordering of the contributing graphic elements. Documents referenced in FIG. 2 can exist as files in data store 110 or can exist as data streams or other formats compatible with processing unit 112.

Figure 3:
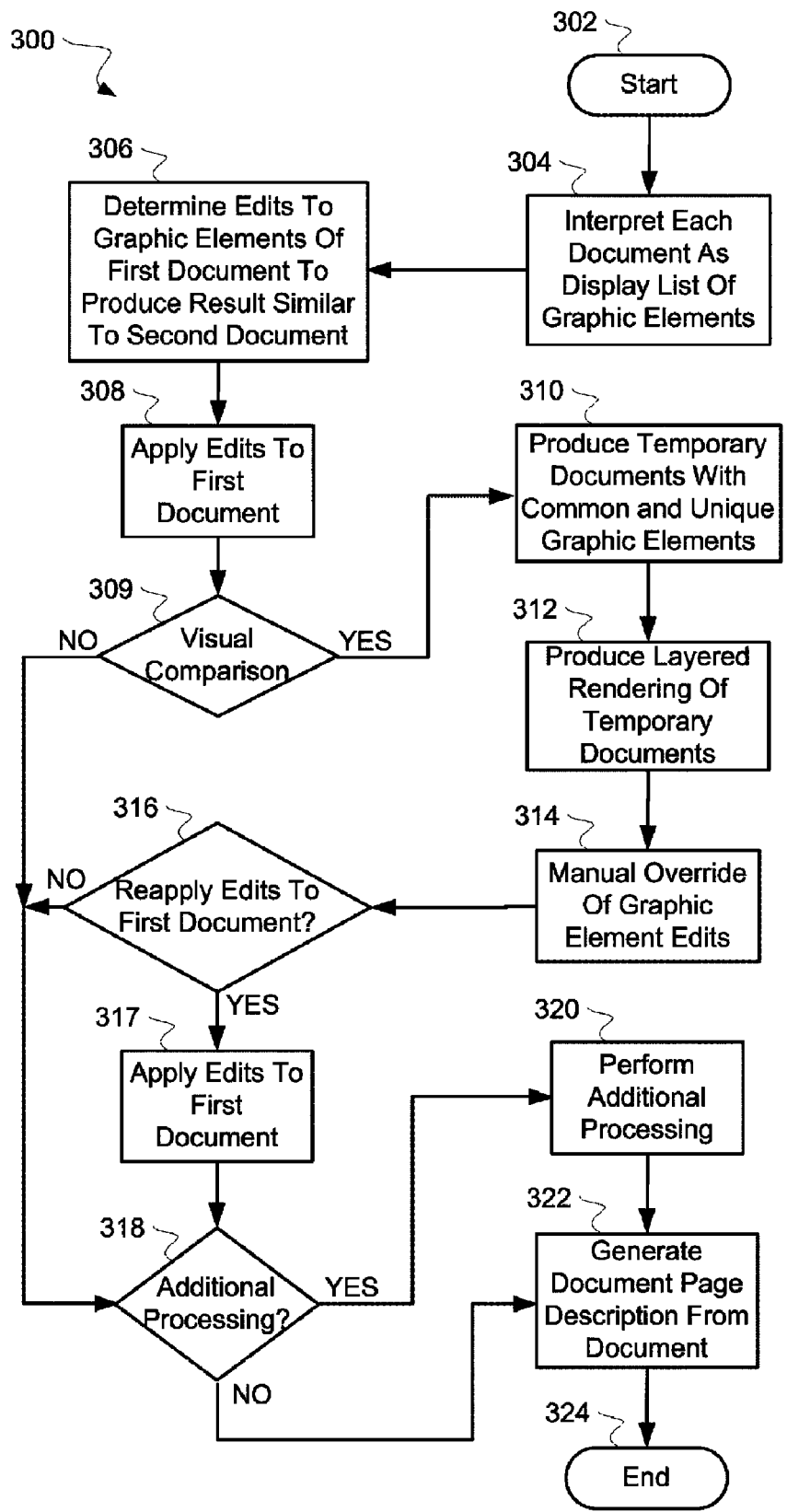
FIG. 3 is a flow chart diagram illustrating a method for processing documents according to one embodiment of the invention.

FIG. 3 is a flow chart diagram describing a basic method for processing graphic documents according to a preferred embodiment of system 200. The method begins at block 302 with a user interacting with a GUI provided by document comparator 210 via input devices 116 or 118 and monitor 114.

Some preliminary production phase processing, known as refining, can occur at or prior to the start of the method so that equivalent graphic elements are consistently defined in the two documents. As an example, a production facility can convert a content phase document to the PDF format from some other page definition format (e.g. native document creation format or PostScript® format). In addition, the syntax and/or the semantics of the page description data may have been altered. Syntax changes can involve representing a document utilizing a different version of the page description language having desirable features. Semantic changes, manifested as changes to graphic elements and their attributes, can correspond with adopting production policies (e.g. always overprint, re-sampling images to a specific resolution, converting filled path graphic elements into separate stroke and fill path graphic elements).

In block 304, document comparator 210 interprets the page description data from first document 201 and second document 202 to produce display-ordered graphic element list (display list) versions of each of the documents. Methods for interpreting page description data into a display list are well known in the art. Unless otherwise specified below, subsequent references to first document 201 and second document 202 pertain to the display list versions of those documents.

In block 306, document comparator 210 examines selected (see below) graphic elements defined by first document 201 and second document 202 to produce an edit script 250 that that is capable of producing merged document 203 which is similar in appearance to second document 202 but preserves some graphic elements from first document 201. Other embodiments of the invention can include edit data in other forms that can be utilized to provide a similar result to edit script 250.

The method continues at 308, document merger 220 applies edit script 250 to first document 201. One result is merged document 203, with graphic elements not selected for comparison and those identified as similar in the two documents preserved from first document 201. Further, graphic elements unique to first document 201 are deleted, and graphic elements unique to second document 202 are added, preserving their relative order from second document 202. Document merger 220 can set attributes on preserved graphic elements indicating the need to re-examine any production-modified attributes.

Document merger 220 also examines production graphic elements present in first document 201 to determine whether to delete them. Rules can be established to govern this, based on edit script 250 and other information. As an example, trap graphic elements are deleted from first document 201 if either of the content graphic elements referenced by the trap graphic element are deleted, since the boundary between these graphic elements no longer exists. Conversely, a trap graphic element is preserved in first document 201 if both of its referenced graphic elements are preserved. Other types of production graphic elements and other scenarios can be accommodated utilizing additional or different rules.

Block 308 completes with document merger 220 producing merge report 204, comprising information about graphic elements affected by the merge process. Information in merge report 204 can include summary or detail information about graphic elements affected by the merge or can identify impacts to the production process corresponding to the affected graphic elements. For example, merge report 204 can identify which printing colorants are unaffected by the merge, so that previously-created printing plates corresponding to one or more colorants can be reused. Merge report 204 can be saved in data store 110 or can be presented in a GUI via monitor 114.

Proceeding at block 309, a decision is made whether to perform a visual comparison of the documents. This can be based on a user preference or in response to a query provided in document merger 220 GUI. If the decision is yes, a visual comparison is performed starting with block 310 as described below. If the decision is no, the method continues at block 318.

Proceeding at block 318, a decision to perform additional processing is made. This can be based on a user preference or in response to a query provided in document merger 220 GUI. Additional document processing 240 provides this processing. If the decision is no, block 322 is performed wherein document merger 220 converts merged document 203 into its page description data format suitable for use by other production applications. Document merger 220 can save merged document 203 to data store 110 and/or can keep it available in processing unit 112 for use by other applications.

If the decision at block 318 is yes, block 320 is performed. Additional document processing 240 can include trap-processing or any other processing relevant to the production phase. In one embodiment of the invention, additional document processing 240 includes two additional trap-processing steps. First, preserved trap graphic elements are re-examined to determine whether any added or deleted graphic elements affect the clipping path of the preserved trap graphic elements. As an example, an added graphic element, situated adjacent to or overlapping a trap graphic element, can cause trapping rules, stored in association with the preserved trap graphic elements, to clip part of the trap graphic element along the path of the added graphic. In general, trapping rules can be quite complex and thus a variety of changes to one or more existing trap graphic elements can result from an added graphic element. Second, trapping rules can be applied to any added content graphic elements where these elements become adjacent to or overlap other content graphic elements in merged document 203. Additional processing 240 produces processed merged document 205 from merged document 203.

Additional document processing 240 next updates or produces an additional merge report 204 that provides information about the trap-processing and its effects on graphic elements. Next, at block 322, additional document processing 240 converts processed merged document 205 into its page description data format and saves it to data store 110.

Automatic Edit Script Creation

Figure 4:
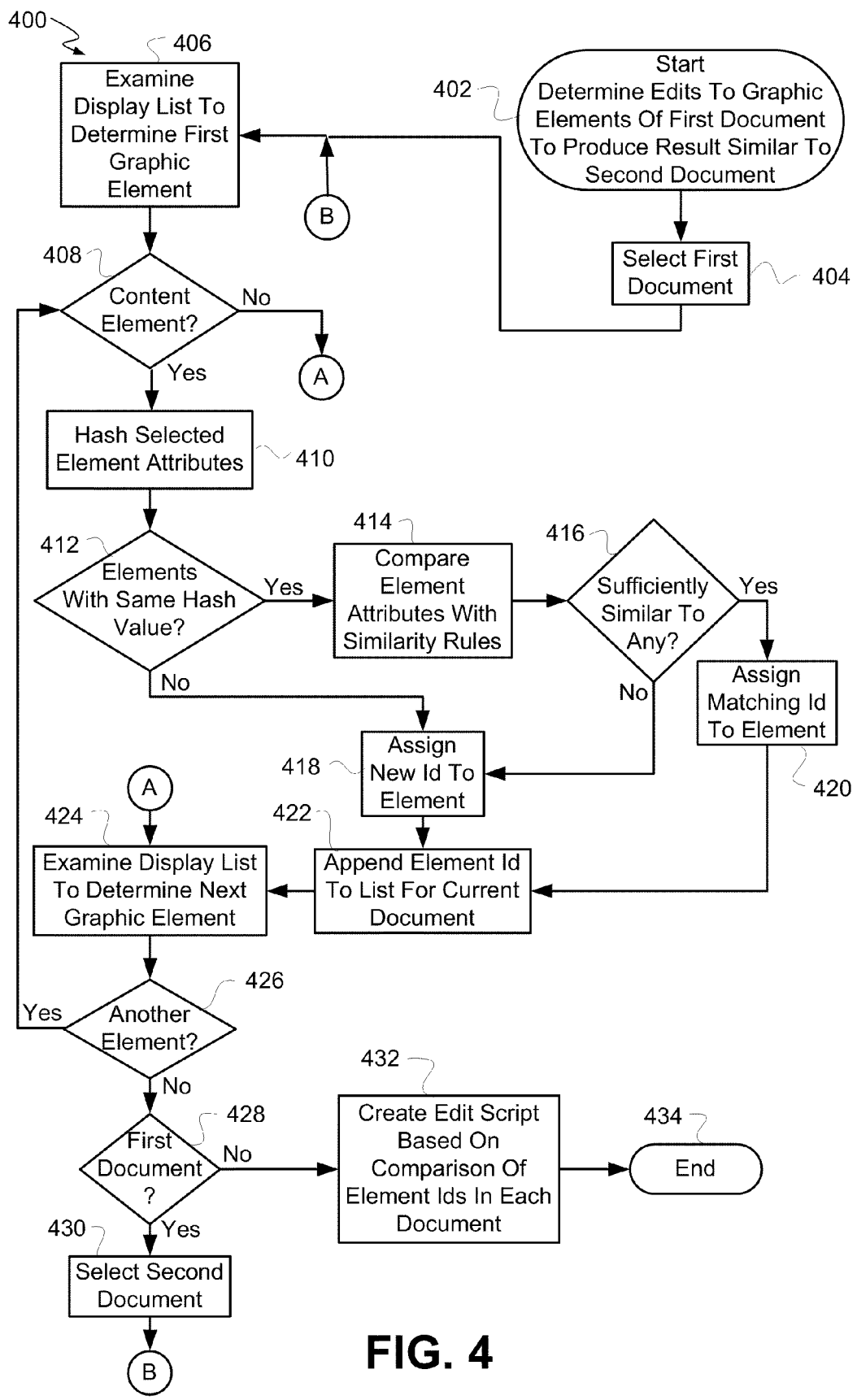
FIG. 4 is a flow chart diagram illustrating a method for comparing graphic elements amongst two documents to produce an edit script capable of merging the documents.

FIG. 4 is a flow chart diagram describing a method that may be used by document comparator 210 to produce edit script 250. The method starts in block 402 with a first goal of producing two ordered lists of unique identifiers corresponding to the selected graphic elements in first document 201 and second document 202, respectively. The identifiers are unique amongst the graphic elements defined by both documents. According to the invention, and described in detail below, a graphic element is similar to another graphic element (i.e. they have the same identifier), if compared attributes are similar, within defined accuracy, to the corresponding attributes of the other graphic element.

The method proceeds at block 404 by selecting first document 201 as the current document. Next, block 406 identifies the first graphic element to be displayed by the current document as the current graphic element.

Proceeding at block 408, the graphic element selection criteria are applied. According to one embodiment of the invention, selection criteria identify only content graphic elements, consistent with the goal of preserving production phase investment in first document 201. As an example, corresponding to the method of FIG. 4, trap and other production graphic elements can be generated with an attribute identifying them as production graphic elements. The selection criteria thus comprises testing for the absence of the production graphic element attribute. Other criteria, based on this or combinations of other attributes associated with the graphic elements can be established to identify other categories of graphic elements. As an example, a criteria that selects all graphic elements can be used to determine differences between both content and production graphic elements in documents that have both been subjected to production phase processing.

At block 408, if the current graphic element is not content, the method proceds to block 424. Otherwise, the method proceeds to block 410.

In the illustrated embodiment, comparisons between graphic elements are facilitated by computing a hash value from attributes of the graphic elements. Other comparison methods may be used in other embodiments of the invention. In block 410 selected attributes of the current graphic element are processed using a hashing algorithm. The hashing algorithm takes variable-length data, corresponding to selected graphic element attributes, and derives fixed-length data, or a hash value from the variable-length data. The attributes and hashing algorithm are chosen so that graphic elements having some similarities produce the same hash value.

Next, in block 412, the set of previously hashed graphic elements is examined. If there is no hash list, identified by a hash value corresponding to the hash value of the current graphic element, a new hash list is created in association with the current graphic element and the method proceeds to block 418 where the current graphic element is associated with the next unique identifier. As an optimization, when processing graphic elements from the first document, the method can always proceed to block 418 since one can assume that each graphic element in the first document is unique.

Otherwise, the method proceeds to block 414 where the current graphic element is associated with an existing hash list identified by the current graphic element's hash value. Next, a detailed comparison of the current graphic element's attributes is performed with each graphic element, associated with the hash list, to determine if any are sufficiently similar to be considered equivalent to one another.

Rules define the meaning of "sufficiently similar". Tables 1-5 exemplify rules according to a preferred embodiment of the invention. These rules aim to ignore visually imperceptible differences between similar graphic elements. Other types of rules, involving graphic element attributes and other criteria, can also be utilized in accordance with the invention. For example, a rule can be established to ensure that a graphic element selected from a document cannot be sufficiently similar to another graphic element from the same document. If two graphic elements from the same document are otherwise sufficiently similar this can be brought to the attention of the user as an unexpected result. Some embodiments of the invention permit a user to fine tune the rules for evaluating the equivalence of graphic elements or to select between different groups of rules for evaluating the equivalence of graphic elements.

TABLE 1

Example Path Graphic Element Similarity Rules

| Attribute | Accuracy |
| --- | --- |
| Clipping path control points | 0.06 pts |
| Painted colorants | 0.01 |

TABLE 1-continued

Example Path Graphic Element Similarity Rules

| Attribute | Accuracy |
| --- | --- |
| Control points (default user space) | 0.06 pts |
| Paint operation | Equivalent |
| Stroke width (if and only if{iff} stroked) | 0.06 pts |
| Line join (iff stroked) | Equal |
| Miter limit (iff stroked) | .1% of min scale |
| Line cap (iff stroked) | Equal |
| Dash pattern (iff stroked) | 0.06 pts |

TABLE 2

Blend Graphic Element Similarity Rules

| Attribute | Accuracy |
| --- | --- |
| Clipping path control points | 0.06 pts |
| Number of path elements | Equal |

TABLE 3

Shading Graphic Element Similarity Rules

| Attribute | Accuracy |
| --- | --- |
| Clipping path control points | 0.06 pts |
| Shading dictionary | Equal |
| CTM delta transform | .1% of min scale |
| CTM offset | 0.03 pts |

TABLE 4

Example Text String Graphic Element Similarity Rules

| Attribute | Accuracy |
| --- | --- |
| Clipping path control points | 0.06 pts |
| Painted colorants | 0.001 |
| TRM delta transform | .1% of min scale |
| TRM offset | 0.06 pts |
| Text render mode | Equivalent |
| PostScript ® font name | Equal |
| Word spacing | $1.5 \times 10-5$ |
| Character spacing | $1.5 \times 10-5$ |
| String | Equal |
| Line width (iff stroked) | 0.03 pts |
| Line (iff stroked) | Equal |
| Miter limit (iff stroked) | .1% of min value |
| Line cap (iff stroked) | Equal |
| Dash pattern (iff stroked) | 0.03 pts |
| Sub-paths | Recursive application of path comparison |

TABLE 5

Example Image Graphic Element Similarity Rules

| Attribute | Accuracy |
| --- | --- |
| Clipping path control points | 0.06 pts |
| Colorants | Equal |
| CTM delta transform | .1% of min scale |
| CTM offset | 0.03 pts |
| Dimension | Equal |
| Bit depth | Equal |
| Pixel values | Equal |
| Mask type | Equal |

TABLE 5-continued

Example Image Graphic Element Similarity Rules

| Attribute | Accuracy |
|---|---|
| Color mask (iff color masked) | Equal |
| Image mask (iff masked by position) | Recursive application of image comparison |

The single hash key method described above is suitable for attributes having discrete values. For attributes that have continuous (or a sufficiently large number of) values, it can be advantageous to quantize a value range into discrete bins so that a discrete hashing algorithm can be used. Depending on the degree of quantization and the tolerances defined by corresponding similarity rules, two graphic elements which are sufficiently similar that they should be found to be equivalent could produce different hash values using the single hash key method. To ensure that sufficiently similar elements, having these type of attributes, are identified, multiple hash values can be generated for each graphic element, based on the quantization and tolerance applied. A graphic element could thus be associated with more than one hash list. When searching for sufficiently similar graphic elements, multiple hash lists, corresponding to multiple hash values generated for a graphic element, are examined.

In a simplified example, assume that a hash value for a graphic element of the "text" type is based only on a point size attribute. Further assume that point sizes are quantized, prior to hashing, into bin numbers corresponding to point sizes from 0 to 100 in increments of 0.1 points. Further assume that text elements having point sizes within 0.06 points are "sufficiently similar" for a particular application. If a text element has a point size of 10.05, rules dictate that it is similar to other text elements whose point size values are within the range (9.99<=size<=10.11). A first hash value is generated using a first bin corresponding to the range (10.00<=size<10.10) since the text element's point size (10.05) lies within that range. A second hash value is generated using a second bin corresponding to the range (9.90<=size<10.00) since a similar text element with point size (9.99) would lie within that range. A third hash value is generated using a third bin corresponding to the range (10.00<=size<10.10) since a similar text element with point size (10.11) would lie within that range. If multiple attributes requiring quantization were hashed, the number of generated hash values would increase according to the number of combinations of potentially matching bins.

The method continues at block 416 where the result of the sufficient similarity comparison is decided. If the current graphic element is not found to be sufficiently similar to any previously-processed graphic elements, the method proceeds to block 418 where the current graphic element is associated with the next unique identifier. Otherwise, at block 420, the current graphic element is associated with the unique identifier associated with the graphic element that it is sufficiently similar to.

Proceeding from block 418 or 420 to block 422, the method appends the current graphic element's identifier to the list corresponding to the current document. A list of graphic element identifiers is preferred to a list of graphic elements because such a list utilizes fewer resources from processing unit 112 during later comparisons.

Proceeding to block 424, the method examines the current document to determine if another graphic element exists after the current graphic element. At block 426, if a next graphic element is found, it is identified as the current graphic element and the method proceeds to block 408. Otherwise the current graphic element is the last graphic element in the current document. In the latter case, the method proceeds to block 428 where the current document is examined to determine if it is first document 201. If yes, second document 202 is identified as the current document at block 430 and the method proceeds to block 406. Otherwise, the method proceeds to block 432, the first goal having been accomplished.

At block 432, the two lists are examined by document comparator 210 to generate an edit script 250 capable of changing the first list into the second list. Specifically, edit script 250 comprises a set of graphic element actions, including: delete (from first document 201), and add (from second document 202). Finally, document comparator 210 sets attributes of certain graphic elements to indicate that these graphic elements may require additional processing.

Methods suitable for creating edit script 250 are well known in the art. An example method proceeds by:

Examining items in both lists, in order, until a common item is found.

Then, delete all items in the first list between the last common item (or start of list initially) and the new common item.

Then, add all items that are unique to the second list, between the last common item (or start of list initially) and the new common item. Add them to the first list between the last and new common item, preserving their relative order in the second list.

Repeat until both lists have been exhausted, treating the ends of the lists as a common item.

An exemplary method, according to a preferred embodiment of the invention, uses the so-called "Largest Common Substring" algorithm described by W. Miller & E. W. Meyers and detailed in "A File Comparison Program", Software—Practice and Experience 15(11), November 1985, pp. 1025-1040. Other potential sources of related subject matter include: "The String-to-String Correction Problem with Block Moves", ACM Transactions on Computer Systems 2(4), November 1984, pp. 309-321; "A Technique for Isolating Differences Between Files", Communications of the ACM 21(4), April 1978, pp. 264-268.

DETAILED EXAMPLE

This section details a simple example, further illustrating the methods identified in the foregoing description. FIG. 5 is a diagram illustrating a rendering of an exemplary first document 201, immediately following the initial content creation phase. At this stage, first document 201 comprises the following graphic elements, in display order:

Image 501

Rectangular path 510, having no stroke and a dark-colored fill having a clipping path CP1;

Triangular path 520, having no stroke and a light-colored fill;

Square path 540, having no stroke and a dark-colored fill;

Rectangular path 550, having no stroke and a light-colored fill;

Rectangular path 560, having a medium width, dark-colored stroke and no fill, initially part of rectangular path 550 but separated by a refining process; and Text string 570, having no stroke and a dark-colored fill.

Each graphic element has been assigned a default halftone screen S1.

FIG. 6 is a diagram illustrating a rendering of exemplary first document 201 shown in FIG. 5, immediately following the initial production phase that included trap-processing and halftone screening adjustments. FIG. 7 is a data structure diagram corresponding to FIG. 6 and illustrating aspects of exemplary first document 201 and associated data.

Graphic element identifiers, shown in column 704, that would be created according to the methods of FIG. 4, correspond to graphic element references in FIG. 6. For illustrative purposes, the identifiers are chosen so that the last two digits indicate relative display order. The higher-order digits reflect the number of the figure in which the graphic element is first illustrated. This convention is continued throughout subsequent figures.

Trap graphic elements 611, 612, 621, 655 and 665A-D have been added during the production phase to improve the printed quality at boundaries between light-colored and dark-colored content graphic elements. For the purposes of illustration only, a trap graphic element is displayed after the darker content graphic element and before the lighter content graphic element. Further, a trap graphic element's clipping path is adjacent to the lighter-colored graphic element and extends into the darker-colored graphic element. A trap graphic element is created as a path graphic element with a medium-colored fill and no stroke.

FIG. 7 describes selected attributes of content and production graphic elements. Items of note include:
  Hash values that would result from a comparison of graphic elements according to the method described in FIG. 4 are shown in column 706.
  Attribute values, such as Clipping Path and Stroke Width, that are pertinent to the example, are shown in column 708.

FIG. 7 describes selected production-modified graphic attributes in column 710, reflecting:
  the identification of production graphic elements,
  the relationship between trap and content graphic elements, and
  the halftone screen adjustments made (namely element 420 has been associated with screen S2).

Figure 9:
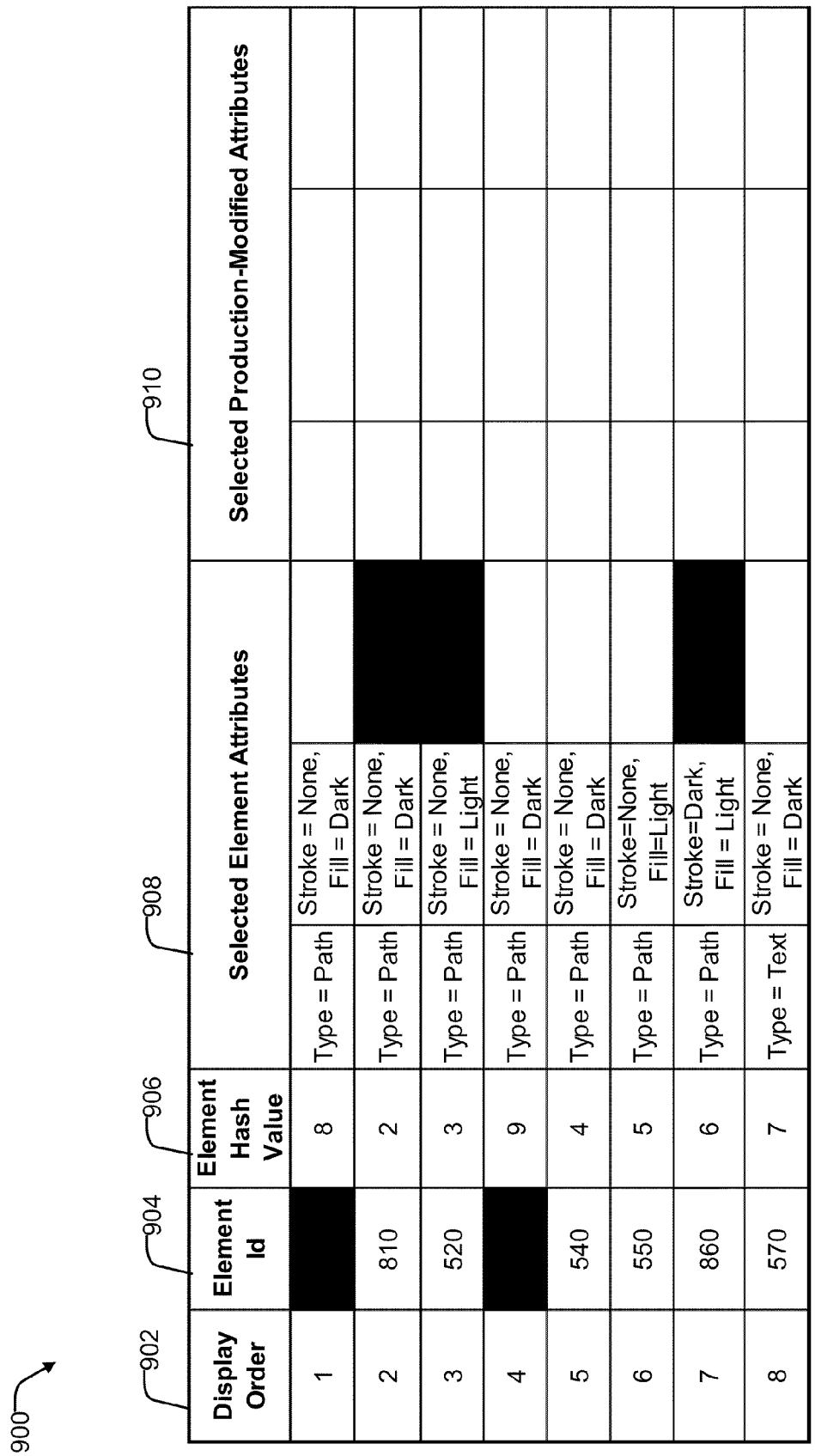
FIG. 9 is a data structure diagram illustrating the document corresponding to FIG. 8.

FIG. 8 is a diagram illustrating a rendering of an exemplary second document 202, immediately following a subsequent content creation phase that has occurred in parallel with the initial production phase. FIG. 9 is a data structure diagram corresponding to FIG. 8 at this stage. Content revisions are highlighted in FIG. 9. In particular:
  Image 501 has been deleted and thus is not shown in FIG. 9.
  Rectangular path 802 and rectangular path 830 have been added.
  Rectangular path 510 has been modified to have a new clipping path, CP1A. Note that this modified graphic element, according to the method of FIG. 4, would have the same hash value as rectangular path 510 but upon detailed examination would not be sufficiently similar and is thus assigned identifier 810.
  Triangular path 520 has halftone screen S1 associated with it, consistent with the original content phase definition.
  Rectangular path 560 has been modified to have a wide stroke width and is identified as 860.

FIG. 10 is a data structure diagram illustrating application of an exemplary edit script 250, generated using the method described in FIG. 4 with inputs: first document 201, illustrated in FIGS. 6 and 7; and second document 202, illustrated in FIGS. 8 and 9. The ordered steps, shown in column 1002, include major steps, indicated by numerals, corresponding to edits that terminate with the preservation of a common item. Step actions, shown in column 1004, include:

"Delete", corresponding to a content graphic element unique to first document 201.
  "Add", corresponding to a content graphic element unique to second document 202.
  "No action", corresponding to a graphic element identified as sufficiently similar amongst both documents. In one embodiment of the invention, this action can be included in the edit script to enable generation of other types of documents using edit script 250 as described below. Other methods for keeping track of compared graphic elements that are sufficiently similar can also be utilized.
  "N/A", corresponding to a graphic element that was not examined during the comparison and thus is preserved in the merged document. This action is not explicitly included in edit script 250.
  "Derived delete", corresponding to a production graphic element depending upon one or more deleted graphic elements. This action is not explicitly included in edit script 250 but is derived by being related to graphic elements that were explicitly deleted.

Step parameters, shown in column 1006, identify the reference document (column 910) for the action and the relative add location (column 1012) where applicable. Additional processing attributes (column 1014) exemplify attributes set by document merger 220, including identification of new objects that may require trap-processing and preserved trap graphic elements that may require adjustment. Additional processing outcomes (column 1020) indicate what would occur if additional processing is performed. Outcomes are described in more detail in FIG. 13.

Figure 11:
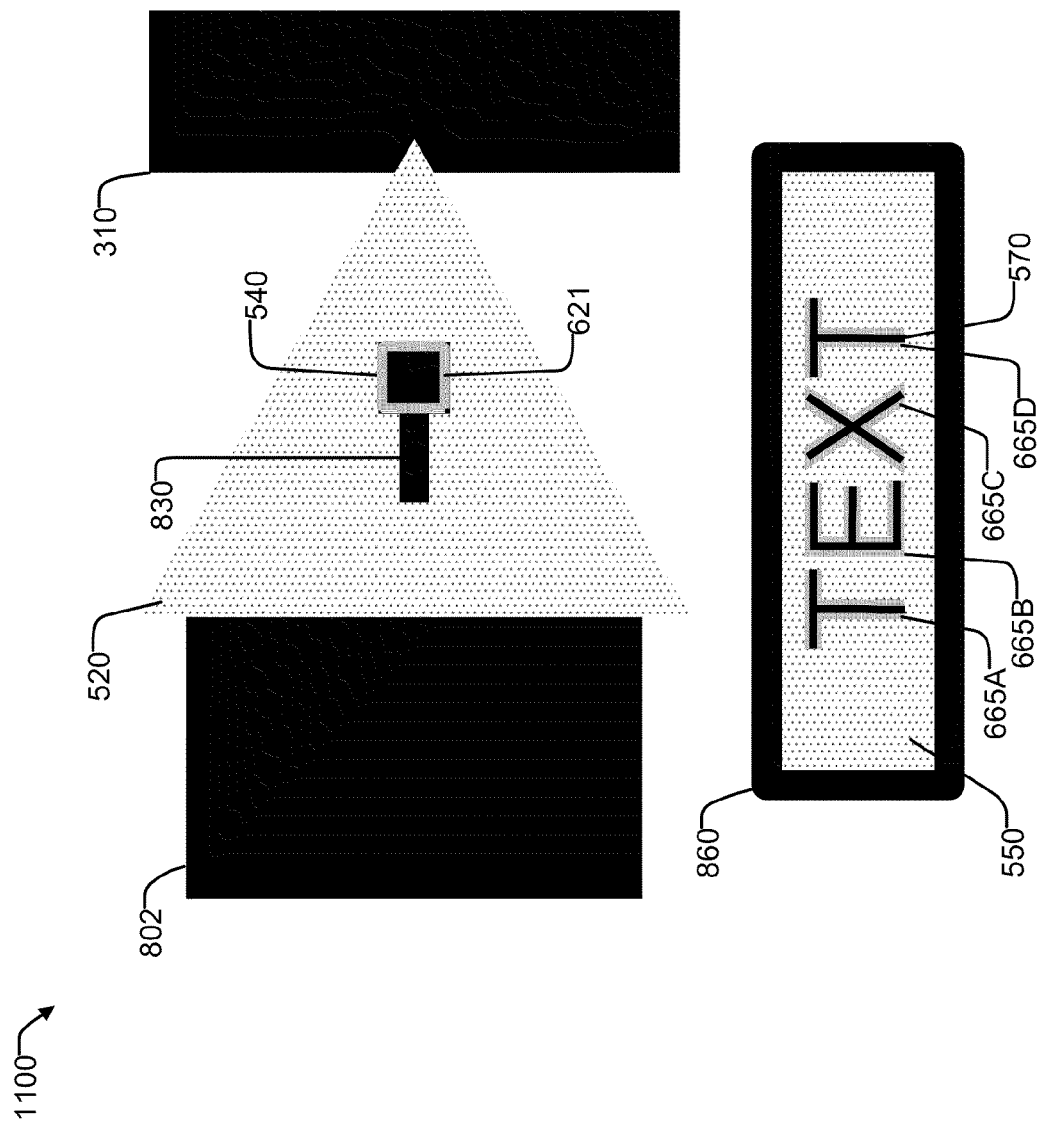
FIG. 11 is a diagram illustrating the rendered appearance of a merged document created by applying an edit script to a first document.

FIG. 11 is a diagram illustrating a rendering of exemplary merged document 203. FIG. 12 is a data structure diagram corresponding to FIG. 11, and illustrating aspects of exemplary merged document 203 and associated data. Items of note include:
  Graphic elements 501, 510, 611, 612, 655, and 560 were deleted from first document 201 illustrated in FIG. 7 and thus are not part of these figures.
  Graphic elements 802, 810, 830 and 860 were added from second document 202, illustrated in FIG. 8. Added elements preserved their relative order in second document 202.
  All other graphic elements from first document 201 were preserved along with any production-modified graphic attributes. As an example, triangular path 520 screen is S2 and rectangular path 621 clipping path is CP2. Related element associations were updated to correspond with deleted elements.

Figure 13:
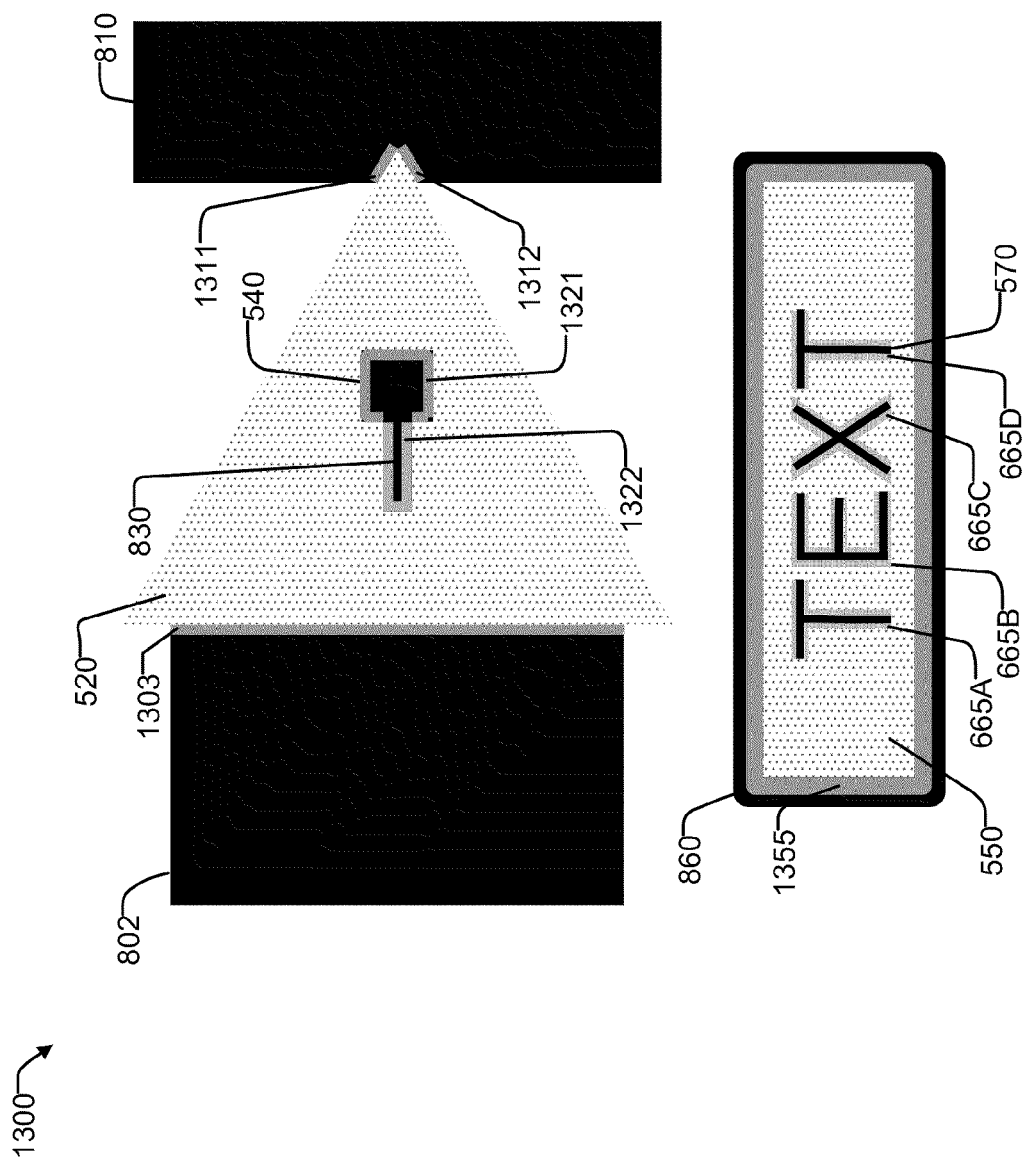
FIG. 13 is a diagram illustrating the rendered appearance of a document created by performing additional processing on a merged document.
Figure 14:
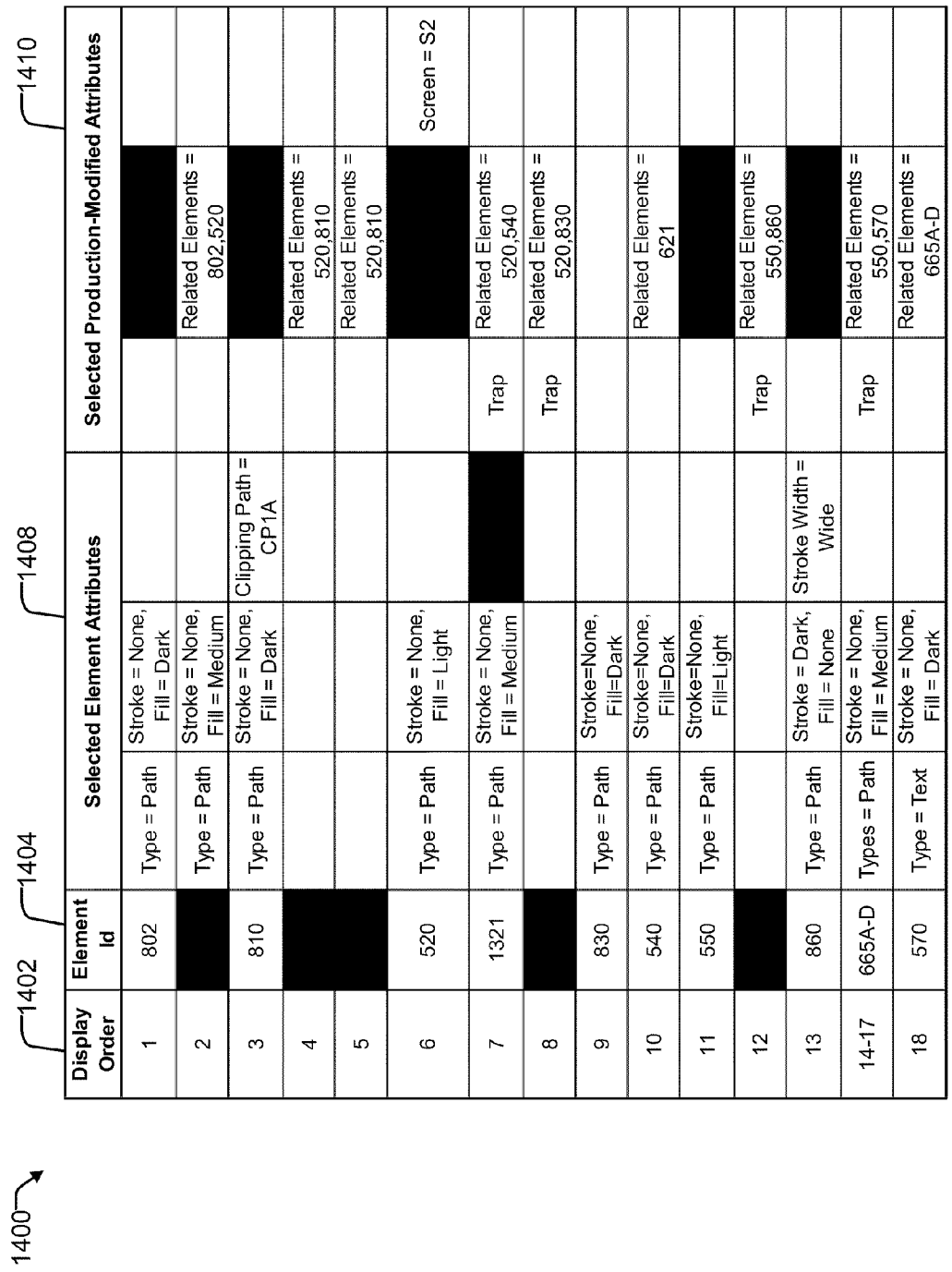
FIG. 14 is a data structure diagram illustrating the document corresponding to FIG. 13.

FIG. 13 is a diagram illustrating a rendering of exemplary processed merged document 205. FIG. 14 is a data structure diagram corresponding to FIG. 13 and illustrating aspects of exemplary processed merged document 205 and associated data. Items of note include:
  Trap graphic elements 1303, 1311, 1312, 1322 and 1355 were added to correspond with new content graphic element boundaries created by adding graphic elements 802, 810, 830 and 860. Related element associations for affected graphic elements were updated.
  Trap graphic element 1321 clipping path was adjusted to CP2A because of the boundary created between added rectangular graphic element 830 and square graphic element 540.
  Trap graphic elements 665A-D were unaffected because the boundaries between path graphic element 550 and text graphic element 570 did not change.

Visual Comparison

The method of FIG. 3 also includes steps that allow visual comparison of first document 201 and second document 202. These steps begin after document comparator 210 has generated edit script 250. In one embodiment of the invention, comparison visualizer 230 begins at block 310 by generating three temporary documents based on first document 201, second document 202 and edit script 250. These documents, which can be saved to data store 110 for later use, include:

- Unique to first document 231, includes the graphic elements existing in first document 201 alone. An exemplary method for generating document 231 is to select the graphic elements having "delete" actions in edit script 250.
- Unique to second document 232, includes the graphic elements existing in second document 202 alone. An exemplary method for generating document 232 is to select the graphic elements having "add" actions in edit script 250.
- Common to both 233, includes the graphic elements identified as sufficiently similar in first document 201 and second document 202. An exemplary method for generating document 233 is to select the graphic elements examined during the comparison and identified "no action" actions in edit script 250.

According to one embodiment of the invention, production graphic elements are excluded from the creation of the temporary documents so that visual comparison of content-only graphic elements is achieved.

Next, in block 312, component visualizer 230 presents a GUI including a multi-layered rendering of the temporary documents. The renderings show defined overprint and knock out characteristics within a layer. When more than one layer is visible, the pixels from each visible layer are composited. When composited, graphic element pixels in higher layers knock out graphic element pixels in lower layers so that boundaries between objects existing in different layers are more visible. GUI viewing controls are provided to:

- control the visibility of each layer;
- control the layering order of each rendering;
- adjust the tonality or color of each layer to distinguish graphic elements, having similar tone or color, between layers;
- select one or more graphic elements by asserting graphic element attribute values (e.g. select path graphic elements), causing the graphic element to be highlighted in the GUI; and
- select one or more graphic elements by pointing at an exposed area of the graphic element's pixels in the GUI, causing the graphic element to be highlighted in the GUI.

U.S. Patent Publication No. 2004/0075699 (Franchi) describes graphic element GUI compositing and selection methods and is incorporated by reference herein.

Figure 15:
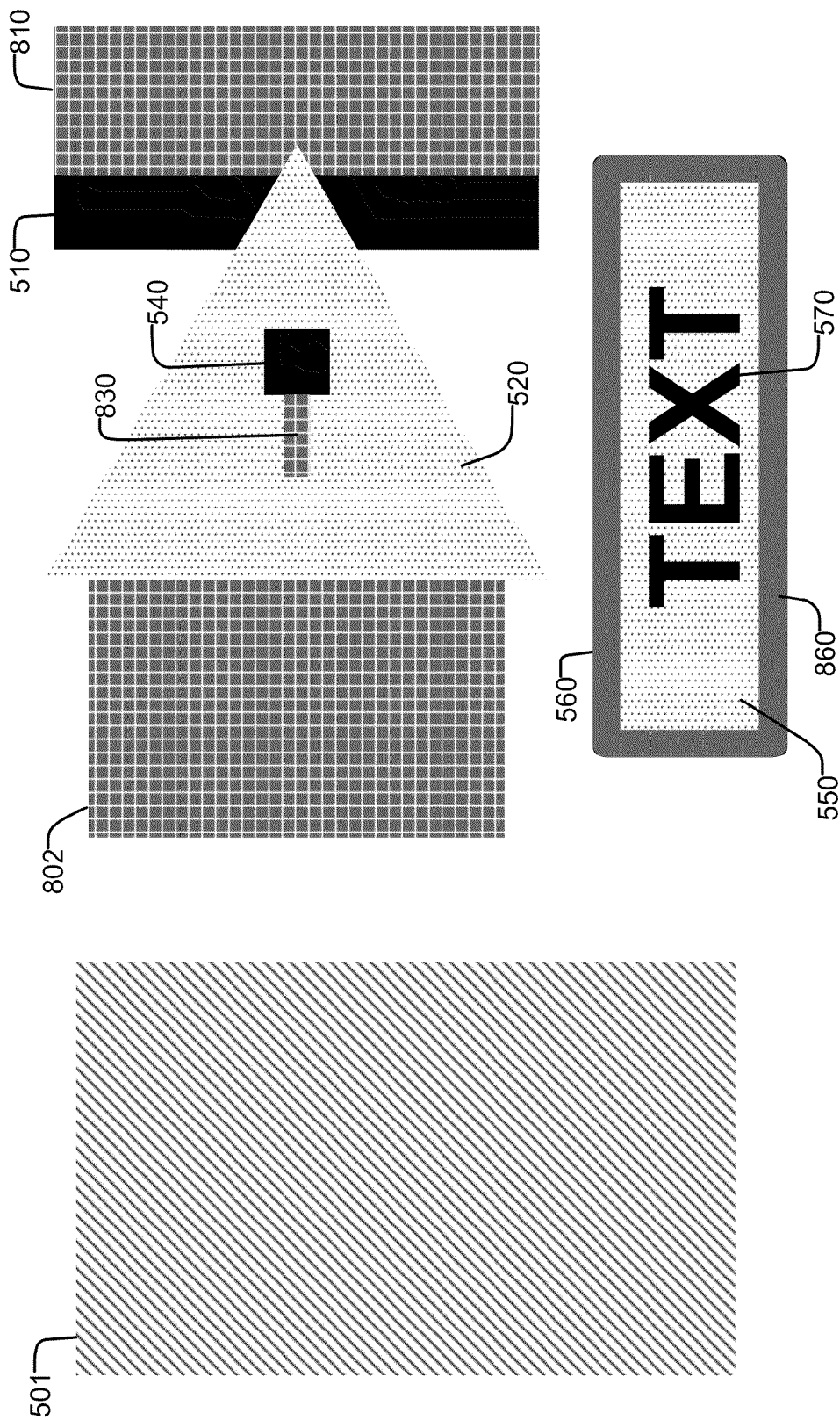
FIG. 15 is a diagram illustrating a portion of a GUI that presents a layered view of graphic elements, with those being common to both documents prominently displayed.

FIG. 15 is a diagram illustrating the rendered display portion of component visualizer 230 GUI from the previously detailed example with all layers visible. Layer common to both 233 is on top, followed by unique to second document 232 and unique to first document 231. The tonality of unique to second document 232 has been decreased so that its dark-colored pixels now appear as medium-colored hatched fills and medium-colored strokes. This view shows the difference in size between graphic elements 510 and 810. It also clarifies the boundary between graphic element 540 and 830. However, in this view, graphic element 860 knocks out graphic element 560.

Figure 16:
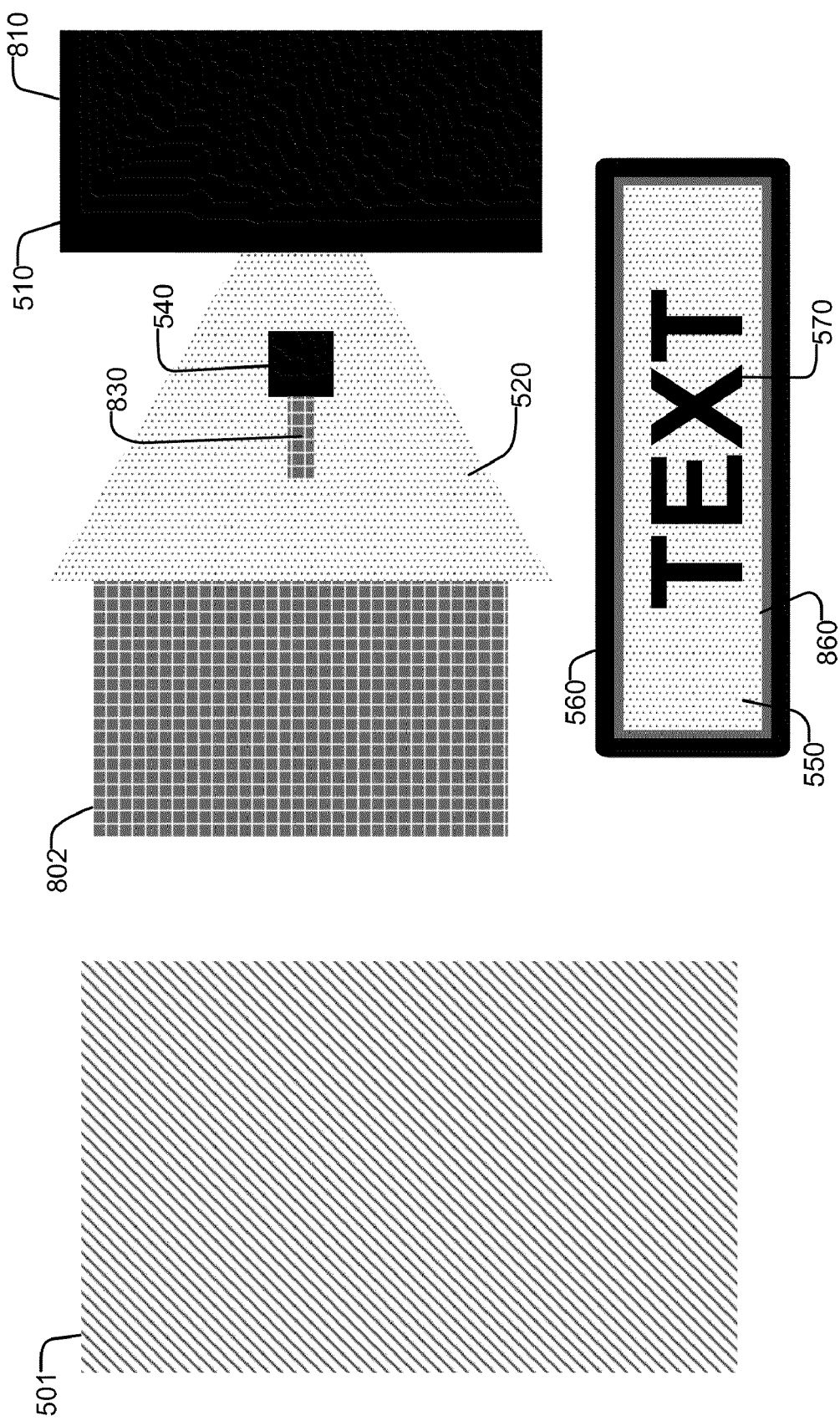
FIG. 16 is a diagram illustrating a portion of a GUI that presents a layered view of graphic elements, with those being unique to the first document prominently displayed; and, FIG. 17 is a diagram illustrating a portion of a GUI that presents a layered view of graphic elements, with those being unique to the second document prominently displayed.

FIG. 16 is a diagram illustrating the rendered display portion of component visualizer 230 GUI from the previously detailed example with all layers visible. Layer unique to first document 231 is on top, followed by common to both 233 and unique to second document 232. This view shows all of graphic element 510 but obscures graphic element 810. This view also shows the difference in stroke width between graphic elements 560 and 860.

Figure 17:
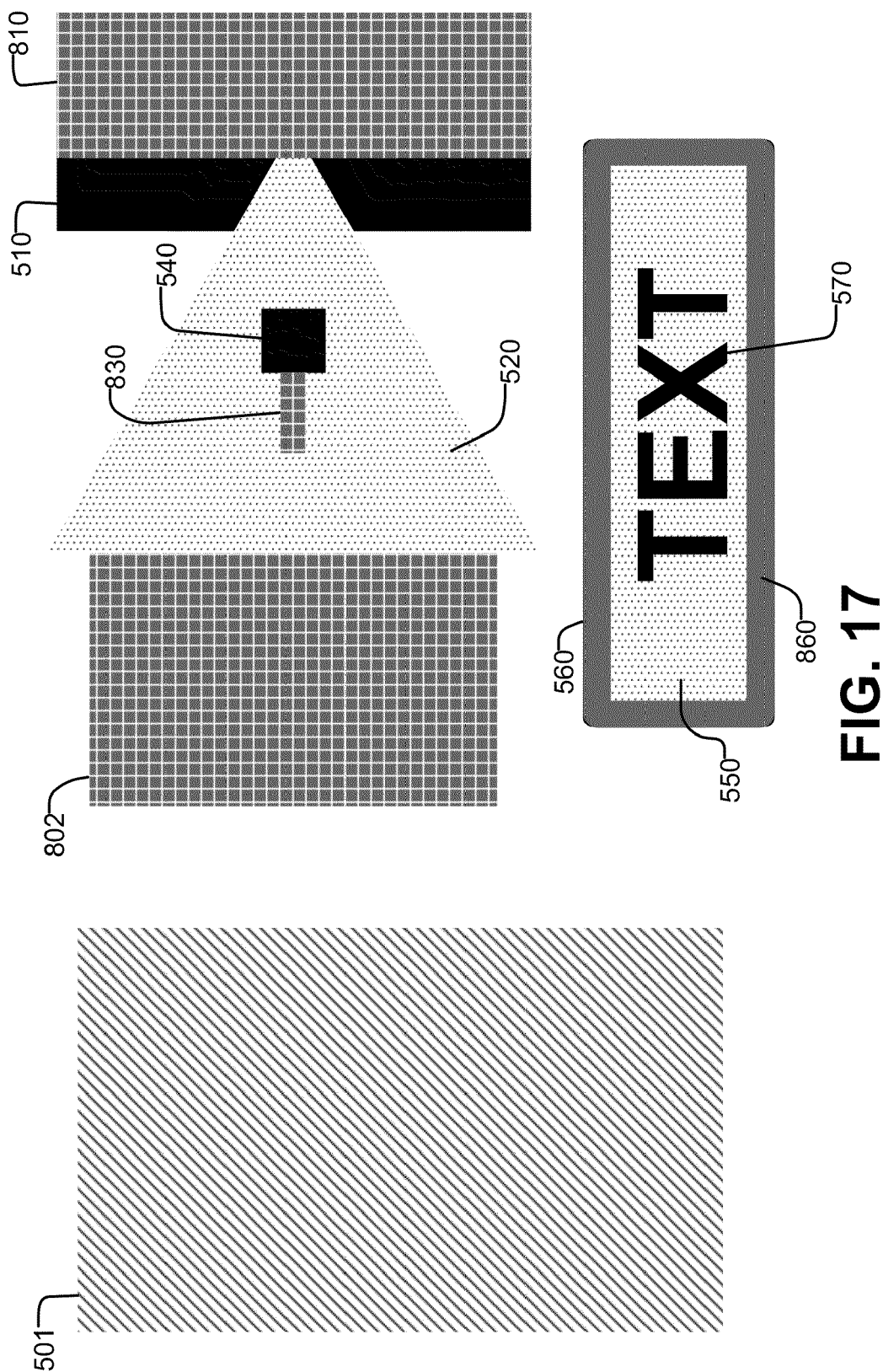

FIG. 17 is a diagram illustrating the rendered display portion of component visualizer 230 GUI from the previously detailed example with all layers visible. Layer unique to second document 232 is on top, followed by common to both 232 and unique to first document 231. This layer presents little new information, relative to the other views, only because of the nature of the particular example. FIG. 17 further illustrates the effects of layer knockouts distorting the artist's visual intent. In another embodiment of the invention, comparison visualizer 230 can include another layer containing the rendering of merged document 203. This enables the artist's visual intent to be viewed in conjunction with the temporary documents.

Block 314 continues after the initial presentation of the layered-view GUI. In addition to the GUI view controls described above, document visualizer 230 provides controls enabling the user to override actions in the automatically generated edit script 250. Controls are provided to:

- view the properties of a selected graphic element, including an indication of whether the selected graphic element is present in merged document 203;
- delete the selected graphic element from the merged document to effect an override in edit script 250, wherein:
  - deleting from common to both 232 results in the "no action" (from first document 201) action being replaced by an add (from second document 202) action for the graphic element in second document 202 having the same identifier,
  - deleting from unique to first document 231 results in the delete (from first document 201) action being replaced by a "no action" action, and
  - deleting from unique to second document 232 results in the "add" action being removed; and
- enable or disable the visibility of deleted graphic element in its corresponding layer.

Block 314 continues with comparison visualizer 230 updating edit script 250 with all action overrides resulting from the GUI session. Block 314 completes with comparison visualizer 230 adjusting production graphic elements actions, affected by the action overrides, in edit script 250. For example, a "derived delete" action can be removed if the "delete" action for a related content graphic element is overridden. The method then proceeds to block 316, where a decision is made to reapply edit script 250. If edit script 250 has been overridden, the decision can be yes, based on a user preference or in response to a prompt provided from comparison visualizer 230 GUI. If the decision is yes, the method proceeds to block 317, having the same behavior as block 308, and then to block 318. If the decision is no, the method proceeds directly to block 318.

In another embodiment of the invention, comparison visualizer 230 executes a method for viewing, based on a single layered document rather than multiple documents. A prerequisite for this method is that each graphic element in the document is associated with one view layer. During display of the document, control of a layer's visibility determines whether pixels, corresponding to the graphic elements associated with that layer, are displayed. The document defines one display order for all graphic elements amongst all layers.

The layered document can be produced by document merger 220, comparison visualizer 230 or by other means.

The layered document can be produced by selecting graphic elements categorized as common to both documents (chosen from either document), unique to the first document and unique to the second document. Graphic elements can be associated to a layer corresponding to their category. Graphic elements chosen from the first document retain their relative display ordering. Similarly graphic elements chosen from the second document retain their relative display ordering. Graphic elements chosen from one document are also ordered relative to graphic elements, chosen from the other document, that are sufficiently similar to graphic elements from the one document. For example, if a first document comprises an ordered list of graphic elements: A, B1, and C and a second document comprises an ordered list of graphic elements: D, B2, and E, the layered document can comprise an ordered list of graphic elements: A, D, B1, C, and E. In this example B1 and B2 are sufficiently similar. Other alternate orderings that preserve the relative ordering from both documents are possible (e.g. D, A, B1, E, C).

Layer-based adjustment of tonality and color may not be provided in some embodiments. In these cases, the ability to distinguish graphic element borders can be accomplished by controlling layer visibility and selecting graphic elements, causing their colors or fills to be altered.

Certain implementations of the invention comprise computer processors, which execute software instructions, which cause the processors to perform a method of the invention. For example, document comparator 210, document merger 220, comparison visualizer 230 and additional processing 240 can all be implemented by providing software, which runs on, or more computer systems 100 and causes the computer systems to operate according to the methods described above. The program product may comprise any medium which carries a set of computer-readable signals comprising instructions which, when executed by a computer processor, cause the computer processor to execute a method of the invention. The program product may be in any of a wide variety of forms. The program product may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

The foregoing descriptions have detailed comparison of documents, primarily in the context of a production environment. It is understood that the methods of the invention have applicability beyond those described. Examples of adapting the basic methods through different embodiments include using a subset of the methods, using alternate architectures, selection criteria and rule sets.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A method for comparing first and second documents, the first and second documents containing corresponding first and second pluralities of graphic elements, the method comprising:
   associating a unique identifier with each graphic element of the first plurality of graphic elements;
   comparing each one of the second plurality of graphic elements with the first plurality of graphic elements;
   associating a unique identifier with a graphic element of the second plurality of graphic elements if the graphic element is not sufficiently similar to any graphic element of the first plurality of graphic elements;
   associating an existing identifier with the graphic element of the second plurality of graphic elements if the graphic element is sufficiently similar to the first graphic element of the first plurality of graphic elements wherein the first graphic element is associated with the existing identifier;
   organizing the unique identifiers into a first list and a second list, entries of the first list corresponding to a display order of the graphic elements from the first document, and entries of the second list corresponding to a display order of the graphic elements from the second document; and
   wherein comparing the second plurality of graphic elements with the first plurality of graphic elements comprises performing a plurality of element-wise comparisons based on a plurality of similarity rules.

2. A method according to claim 1 wherein performing a plurality of element-wise comparisons comprises:
   creating a hash value for a graphic element based on attribute values of the graphic element;
   associating the graphic element with the hash value; and
   performing an element-wise comparison between a first graphic element and a second graphic element if the first and second graphic elements are associated with the same hash value.

3. A method according to claim 1 wherein the plurality of similarity rules include rules that identify two graphic elements as being sufficiently similar if any differences in their corresponding attribute values result in the two graphic elements being visually similar when printed.

4. A method for comparing first and second documents, the first and second documents containing corresponding first and second pluralities of graphic elements, the method comprising:
   assigning a plurality of unique identifiers to the graphic elements of the first and second pluralities of graphic elements wherein, upon determining that a first graphic element of the first plurality of graphic elements is sufficiently similar to a second graphic element of the second plurality of graphic elements, the method comprises associating the same one of the unique identifiers with both the first and second graphic elements;
   organizing the unique identifiers into a first list and a second list, entries of the first list corresponding to a display order of the graphic elements from the first document, and entries of the second list corresponding to a display order of the graphic elements from the second document; and
   further comprising:
      deriving edit data from the first and second lists wherein the edit data can be used to change the first list into the second list; and
      creating at least one target document based on the first and second documents, the first and second lists, and the edit data.

5. A method according to claim 4 wherein creating at least one target document comprises:
   applying the edit data to at least one of the first list and the second list to form a target list; and
   creating at least one target document based at least in part on graphic elements associated with the target list.

6. A method according to claim 4 wherein the first and second plurality of graphic elements are chosen for comparison based on a selection criterion wherein the selection criterion is based on graphic element attributes and information associated with the first and second documents; and
  wherein zero or more unselected graphic elements from the first document and the second document are excluded by the selection criterion.

7. A method according to claim 4 wherein the edit data comprises a plurality of actions wherein actions comprise actions of a plurality of action types, the action types including:
  delete, corresponding to a graphic element that is unique to the first document;
  add, corresponding to a graphic element that is unique to the second document; and
  no-action, corresponding to a graphic element in the first document that is sufficiently similar to a graphic element in the second document.

8. A computer system for comparing documents, the system comprising:
  a processing unit, operative to:
  associate a unique identifier with each graphic element of the first plurality of graphic elements;
  associate a unique identifier with a graphic element of the second plurality of graphic elements if the graphic element is not sufficiently similar to any graphic element of the first plurality of graphic elements;
  associate an existing identifier with a graphic element of the second plurality of graphic elements if the graphic element is sufficiently similar to a first graphic element of the first plurality of graphic elements wherein the first graphic element is associated with the existing identifier;
  organize the unique identifiers into a first list and a second list, entries of the first list corresponding to a display order of the graphic elements from the first document, and entries of the second list corresponding to a display order of the graphic elements from the second document; and
  a monitor for displaying results of the comparison.

9. A computer system for comparing documents, the system comprising:
  a processing unit, operative to:
  assign a plurality of unique identifiers to graphic elements of a first and second plurality of graphic elements of a first and second document respectively;
  compare graphic elements to determine if two graphic elements are sufficiently similar wherein the identifier-assigning means is configured to associate a unique identifier with both a first graphic element from the first document and a second graphic element from the second document if the comparison means determines that the first and second graphic elements are sufficiently similar to one another;
  organize the unique identifiers into a first list and a second list, entries of the first list corresponding to a display order of the graphic elements from the first document, and entries of the second list corresponding to a display order of the graphic elements from the second document;
  a monitor for displaying results of the comparison; and
  wherein the system for comparing documents also includes:
  means for organizing the unique identifiers into a first list and a second list, the entries of the first list corresponding to a display order of the graphic elements from the first document, and the second list corresponding to a display order of the graphic elements from the second document;
  means for deriving edit data from the first and second lists wherein the edit data can be used to change the first list into the second list; and
  means for creating at least one target document based on the first and second documents, the first and second lists, and the edit data.

10. A system according to claim 9 wherein means for creating at least one target document comprises:
  means for applying the edit data to at least one of the first list and the second list to form a target list; and
  means for creating at least one target document based at least in part on the graphic elements associated with the target list.

11. A system according to claim 10 wherein the first and second plurality of graphic elements are chosen for comparison based on a selection criterion wherein the selection criterion is based on graphic element attributes and information associated with the first and second documents; and
  wherein zero or more unselected graphic elements from the first document and the second document are excluded by the selection criterion.

12. An apparatus for comparing documents, the apparatus comprising a processing unit including a document comparator, operative to:
  determine a plurality of unique identifiers corresponding to a first and second plurality of graphic elements defined by a first and second document respectively wherein a unique identifier is associated with both a first graphic element from the first document and a second graphic element from the second document if the characteristics of the first and second graphic elements are sufficiently similar;
  organize the unique identifiers into a first list and a second list, the entries of the first list corresponding to a display order of the graphic elements from the first document, and the second list corresponding to a display order of the graphic elements from the second document; and
  derive edit data from the first and second lists wherein the edit data can be used to change the first list into the second list.

13. An apparatus according to claim 12 also comprising a document merger, operative to create at least one target document based on the first and second documents, the first and second lists, and the edit data.

14. An apparatus according to claim 13 wherein the at least one target document comprises a merged document that is visually similar to the second document when printed.

15. An apparatus according to claim 13 wherein the at least one target document comprises a layered document, having a plurality of layers including at least:
  a common-to-both layer comprising graphic elements from the first document that are sufficiently similar to graphic elements from the second document;
  a unique-to-first layer comprising graphic elements that are unique to the first document; and
  a unique-to-second layer comprising graphic elements that are unique to the second document.

16. An apparatus according to claim 13 wherein the at least one target document comprises:
  a common-to-both document comprising graphic elements from the first document that are sufficiently similar to graphic elements from the second document;
  a unique-to-first document comprising graphic elements unique to the first document; and a unique-to-second document comprising graphic elements unique to the first second document.

17. An apparatus according to claim 13 comprising a comparison visualizer operative to present a view of at least one target document comprising a plurality of layer views, a layer view comprising pixels rendered from a plurality of graphic elements associated with a layer view, the visibility of a layer view being separately controllable.

18. A method for comparing first and second documents, the first and second documents containing corresponding first and second pluralities of graphic elements, the method comprising:

assigning a plurality of unique identifiers to the graphic elements of the first and second pluralities of graphic elements;

wherein, upon determining that a first graphic element of the first plurality of graphic elements is sufficiently similar to a second graphic element of the second plurality of graphic elements, the method comprises associating the same one of the unique identifiers with both the first and second graphic elements; and wherein determining that a first graphic element is sufficiently similar to a second graphic element is based on at least one graphic element attribute accuracy value wherein two graphic elements are considered sufficiently similar if, for each at least one graphic element attribute accuracy value, the corresponding values of the two graphic element attributes differ by less than the corresponding accuracy value.

* * * * *

UNITED STATES PATENT AND TRADEMARK OFFICE
CERTIFICATE OF CORRECTION

PATENT NO. : 8,032,824 B2
APPLICATION NO. : 12/414693
DATED : October 4, 2011
INVENTOR(S) : Lawrence Croft et al.

Page 1 of 1

It is certified that error appears in the above-identified patent and that said Letters Patent is hereby corrected as shown below:

| Issued Patent | | Description of Error |
|---|---|---|
| Column | Line | |
| Title Page | 73 | "Eastman Kodak Company, Rochester, NY (US)" should read "Kodak Graphic Communications Canada Company, Burnaby (CA)" |

Signed and Sealed this
Seventeenth Day of July, 2012

David J. Kappos
*Director of the United States Patent and Trademark Office*